(12) United States Patent
Xiang

(10) Patent No.: US 11,234,055 B2
(45) Date of Patent: Jan. 25, 2022

(54) SERVICE DATA PROCESSING METHOD AND APPARATUS

(71) Applicant: HUAWEI TECHNOLOGIES CO., LTD., Guangdong (CN)

(72) Inventor: Junling Xiang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/106,486

(22) Filed: Nov. 30, 2020

(65) Prior Publication Data

US 2021/0084383 A1   Mar. 18, 2021

Related U.S. Application Data

(63) Continuation of application No. PCT/CN2019/087471, filed on May 17, 2019.

(30) Foreign Application Priority Data

Jun. 1, 2018   (CN) .......................... 201810558341.9

(51) Int. Cl.
*H04N 21/64* (2011.01)
*H04B 10/07* (2013.01)
(Continued)

(52) U.S. Cl.
CPC ... *H04N 21/64792* (2013.01); *H04B 10/0795* (2013.01); *H04N 21/6118* (2013.01); *H04N 21/64738* (2013.01)

(58) Field of Classification Search
CPC ......... H04N 21/64792; H04N 21/6118; H04B 10/0795
(Continued)

(56) References Cited

U.S. PATENT DOCUMENTS

| 6,339,628 | B1 | 1/2002 | Yoshida |
| 2012/0134674 | A1 | 5/2012 | Shin et al. |

(Continued)

FOREIGN PATENT DOCUMENTS

| CN | 1734986 A | 2/2006 |
| CN | 1770673 A | 5/2006 |

(Continued)

OTHER PUBLICATIONS

Stephen J. Trowbridge et al,"Flex Ethernet Implementation Agreement 1.1", IA OIF-FLEXE-01.1, Jun. 21, 2017, total 35 pages.

*Primary Examiner* — Jeffery A Williams
(74) *Attorney, Agent, or Firm* — Womble Bond Dickinson (US) LLP

(57) ABSTRACT

A service data processing method and apparatus is disclosed. A data frame is divided into code blocks with smaller granularity, and service data is mapped to a corresponding quantity of code blocks in the data frame based on a service requirement. In addition, the data frame is used to indicate a location of a code block carrying the service data. In one manner, a code block in a payload area of the data frame is divided into a data code block and an overhead code block, and the overhead code block is used to indicate a location of a data code block carrying the service data. In the another manner, an indication field is configured in an overhead area of the data frame to indicate a location of a code block that carries the service data and that is in the payload area of the data frame.

20 Claims, 14 Drawing Sheets

(51) Int. Cl.
*H04N 21/61* (2011.01)
*H04N 21/647* (2011.01)
*H04B 10/079* (2013.01)

(58) Field of Classification Search
USPC .................................................. 375/240.01
See application file for complete search history.

(56) References Cited

U.S. PATENT DOCUMENTS

| | | |
|---|---|---|
| 2017/0005949 A1 | 1/2017 | Gareau |
| 2019/0253178 A1 | 8/2019 | Zha |
| 2021/0152898 A1* | 5/2021 | Li .......................... H04B 10/27 |

FOREIGN PATENT DOCUMENTS

| | | | |
|---|---|---|---|
| CN | 101442692 A | 5/2009 | |
| CN | 106712893 A | 5/2017 | |
| CN | 106788855 A | 5/2017 | |
| CN | 108011702 A | 5/2018 | |
| EP | 0944195 A3 | 12/2002 | |
| EP | 2045934 A1 | 4/2009 | |
| EP | 3177029 A1 | 6/2017 | |
| WO | 2005043794 A2 | 5/2005 | |

* cited by examiner

Code block map

SERVICE DATA PROCESSING METHOD AND APPARATUS

CROSS-REFERENCE TO RELATED APPLICATIONS

This application is a continuation of International Patent Application No. PCT/CN2019/087471, filed on May 17, 2019, which claims priority to Chinese Patent Application No. 201810558341.9, filed on Jun. 1, 2018. The disclosures of the aforementioned applications are hereby incorporated by reference in their entireties.

TECHNICAL FIELD

This application relates to the field of optical communications technologies, and in particular, to a service data processing method and apparatus.

BACKGROUND

Development of video services drives a growth in traffic from users to a data center (DC). To meet a bandwidth requirement of the video services, an optical transport network (OTN) is further deployed closer to a user, to meet differentiated bearer requirements of different services, such as a fixed service, a mobile service, and a private line service.

Currently, an OTN supports a relatively large slot granularity, and supports a minimum slot size of 1.25 gigabits per second (Gbps). For a low-rate service that requires a transmission rate of less than 1.25 Gbps, resources are wasted if a fixed slot is used for mapping the low-rate service.

SUMMARY

This application provides a service data processing method and apparatus, to address resource waste in the prior art.

According to a first aspect, an embodiment of this application provides a service data processing method. The method is applied to a transmitter side, and includes: receiving service data, and then mapping the service data to a first quantity of code blocks in a data frame, where the first quantity of code blocks includes an overhead code block and a data code block, the data code block is used to carry the service data, and the overhead code block includes location information of the data code block used to carry the service data. In an embodiment, the overhead code block may further include quantity information of the data code block used to carry the service data.

In an embodiment of this application, the data frame is divided into the data code block and the overhead code block, so that a low-rate service may occupy some code blocks as required, and a receiver side can restore the service data from the data frame based on the location information in the overhead code block. This can avoid resource waste caused by a high rate corresponding to a slot and a low service rate.

The data frame in an embodiment of this application may be an OTN frame, for example, an OPU frame, an ODU frame, an OTU frame, or a FlexO frame. The data frame may be alternatively a FlexE frame.

In an embodiment, the code block may be a 66B code block. In this case, the solution provided in this embodiment of this application may be applied to a scenario in which service data passes through a FlexE network and an OTN network, or may be applied to a scenario of a FlexE network.

When the solution is applied to the scenario of a FlexE network, a data code block used to carry service data and an overhead code block used to carry location information corresponding to the service data are configured in payload code blocks included in a FlexE frame.

When the solution is applied to the scenario in which service data passes through a FlexE network and an OTN network, in the FlexE network, a data frame is a FlexE frame, and in the OTN network, a data frame may be an ODU frame. Because the FlexE frame includes a 66B code block, division is not required, and only a data code block and an overhead code block that are used for mapping the service data need to be determined in payload code blocks. However, in an embodiment of this application, the OTN frame may be divided into 66B code blocks, so that the service data correspondingly transmitted in the two networks by transmission devices corresponding to the two networks may be considered as a 66B code block stream. In this way, the service data passes through the FlexE network and the OTN network.

In an embodiment, the data frame includes a second quantity of code blocks, the data frame is an ODU frame or a flexible optical transport network FlexO frame, and the second quantity is greater than or equal to the first quantity. The data frame may be alternatively a FlexE frame. The foregoing design provides a manner of dividing a data frame into code blocks. If bits included in the data frame cannot be divided into an integer quantity of code blocks, the data frame may further include fixed padding.

In an embodiment, the data frame includes a plurality of consecutive ODU frames or FlexO frames, the plurality of consecutive ODU frames or the plurality of consecutive FlexO frames include a third quantity of code blocks, and the third quantity is greater than or equal to the first quantity. The foregoing design provides another manner of dividing a data frame into code blocks, where the plurality of consecutive ODU frames or FlexO frames are divided into an integer quantity of code blocks.

In an embodiment, the data frame includes a fixed slot area and a non-fixed slot area, the data frame is an ODU frame or a FlexO frame, the non-fixed slot area includes a fourth quantity of code blocks, and the fourth quantity is greater than or equal to the first quantity. The foregoing design provides still another manner of dividing a data frame into code blocks. In addition, if the non-fixed slot area cannot be exactly divided into an integer quantity of code blocks, fixed padding may be added.

In an embodiment, the first quantity is determined based on a service rate of the service data and a rate of the data frame. In an embodiment, a quantity and locations of code blocks used for mapping the service data may be dynamically determined based on the service rate of the service data and the rate of the data frame by using a received bandwidth allocation algorithm sent by a controller or a network manager.

According to a second aspect, an embodiment of this application provides a service data processing method. The method is applied to a transmitter side, and includes: receiving service data, and then mapping the service data to a first quantity of code blocks in a data frame, where the first quantity of code blocks is used for mapping the service data, an overhead area of the data frame includes at least one first indication field, and the first indication field are used to indicate a location of a code block carrying the service data.

In an embodiment of this application, a payload area of the data frame is divided into code blocks to carry the service data, and an indication field is configured in the overhead area of the data frame to indicate a location of a code block to which the service data is mapped. In this way, a low-rate service may occupy some code blocks as required, and a receiver side can restore the service data from the data frame based on content of the indication field in the overhead area. This can avoid resource waste caused by a high rate corresponding to a slot and a low rate required by a service.

The data frame in an embodiment of this application may be an OTN frame, for example, an OPU frame, an ODU frame, an OTU frame, or a FlexO frame. The data frame may be alternatively a FlexE frame.

In an embodiment, the code block is a 66B code block. In this case, the solution provided in this embodiment of this application may be applied to a scenario in which service data passes through a FlexE network and an OTN network, or may be applied to a scenario of a FlexE network.

When the solution is applied to the scenario of a FlexE network, a payload code block included in a FlexE frame is used to carry service data, an indication field is configured in an overhead code block included in the FlexE frame, and the indication field is used to indicate a location of the payload code block carrying the service data.

When the solution is applied to the scenario in which service data passes through a FlexE network and an OTN network, in the FlexE network, a data frame is a FlexE frame, and in the OTN network, a data frame may be an ODU frame. Because the FlexE frame includes a 66B code block, division is not required, and only a location of a payload code block used for mapping the service data needs to be determined in payload code blocks. However, in this embodiment of this application, the OTN frame may be divided into 66B code blocks, so that the service data correspondingly transmitted in the two networks by transmission devices corresponding to the two networks may be considered as a 66B code block stream. In this way, the service data passes through the FlexE network and the OTN network.

In an embodiment, the data frame may include a plurality of consecutive ODU frames, or the data frame includes a plurality of consecutive FlexO frames.

In an embodiment, a plurality of consecutive data frames form a multiframe, and a quantity of code blocks included in a payload area of each data frame is the same as a quantity of indication fields that include the first indication field and that are in an overhead area of the multiframe. An $i^{th}$ indication field of the multiframe includes identification information of service data carried by an $i^{th}$ code block in the payload area of the data frame. i is any positive integer less than or equal to n, and n is the quantity of code blocks included in the payload area of the data frame. In other words, an arrangement sequence number of the indication field is the same as an arrangement sequence number of a code block that is in the payload area of the data frame and that is indicated by the indication field.

In an embodiment, if a quantity of indication fields configured in an overhead area of a data frame does not match a quantity of code blocks included in a payload area of the data frame, a multiframe may be formed by using a plurality of data frames, so that a quantity of indication fields configured in an overhead area of the multiframe matches the quantity of code blocks included in the payload area of the data frame.

In an embodiment, a quantity and locations of code blocks carrying the service data are determined in the following manner: receiving location information, sent by a controller or a network manager, of a code block that is in the data frame and that needs to be occupied by a service corresponding to the service data. In an embodiment, the location information of the code block that is in the data frame and that needs to be occupied by the service may be determined by the controller or the network manager based on bandwidth of the data frame and bandwidth required by the service.

In an embodiment, the method further includes: if it is determined that the bandwidth required by the service changes, sending changed bandwidth of the service to the controller or the network manager; receiving the location information, sent by the controller or the network manager, of the code block that is in the data frame and that needs to be occupied by the service after the bandwidth changes; adding switching information to an overhead area of a data frame to which the service data is to be mapped, where the switching information is used to indicate that a location, in each data frame, of a service transmitted starting from a next multiframe period changes; and when the next multiframe period arrives, mapping the service data to the data frame based on the received location information of the code block that is in the data frame and that needs to be occupied by the service after the bandwidth changes.

In an embodiment, after it is determined that the service bandwidth changes, the controller or the network manager is notified, so that the network manager or the controller can reconfigure a location of a code block for the service based on the changed bandwidth, and instruct the receiver side to send service data by using a changed location starting from the next multiframe period. This avoids a service data restoration failure caused because the receiver side does not know when to start to update a location of a code block for parsing the service data.

In an embodiment, the first quantity of code blocks used for mapping the service data may further include an overhead code block and a data code block, the data code block is used to carry the service data, and the overhead code block includes clock information and/or time information of the service data mapped to a data frame in which the overhead code block is located.

The foregoing embodiment provides a feasible solution when the receiver side needs to learn of the clock information and/or the time information of the service data. The overhead code block is configured in the code blocks in the payload area to carry the clock information and/or the time information.

In an embodiment, the first indication field further includes indication information, and the indication information is used to indicate that a code block that is in the payload area of the data frame and whose arrangement sequence number is the same as that of the first indication field is a data code block or an overhead code block. The foregoing design provides a simple and feasible manner of learning, by the receiver side, whether a code block in the payload area is a data code block or an overhead code block.

In an embodiment, if the first quantity is less than a preset threshold, the first quantity of code blocks only in a first data frame of the multiframe include the overhead code block. In the foregoing design, if the service data requires a relatively small quantity of code blocks, and the clock information and/or the time information needs to be configured for the service data, an overhead code block may be configured in a payload area only in the first data frame of the multiframe, and an overhead code block in another data frame is used as a data code block to carry the service data, so that resource waste can be avoided.

According to a third aspect, an embodiment of this application provides a service data processing method. The method is applied to a receiver side and includes: determining a location of a code block that is in a received data frame and that carries service data; and obtaining the service data from the code block that corresponds to the location and that is included in a payload area of the data frame.

In an embodiment, the data frame exists in a form of a code block, and a low-rate service occupies some code blocks. Therefore, after determining the location for carrying the service data, the receiver side obtains the service data from the code block at the corresponding location in the payload area.

In an embodiment, the location of the code block occupied by the service data may be preconfigured on the receiver side.

In an embodiment, the determining a location of a code block that is in a received data frame and that carries the service data includes: identifying an overhead code block in a plurality of code blocks included in the data frame, where the overhead code block includes location information of a data code block used to carry the service data; and the obtaining the service data from the code block that corresponds to the location and that is included in a payload area of the data frame includes: obtaining, based on the location information, the service data from the data code block included in the data frame.

The foregoing design provides a feasible manner of determining a location of a code block carrying service data. A data code block and an overhead code block are distinguished from each other in code blocks that are included in a data frame and that are used for mapping the service data, and the overhead code block carries quantity information and location information of the data code block to which the service data is mapped.

In an embodiment, a plurality of consecutive data frames form a multiframe, and a quantity of indication fields included in an overhead area of the multiframe is the same as a quantity of code blocks included in each data frame. An $i^{th}$ indication field of the multiframe includes identification information of service data carried by an $i^{th}$ code block in the payload area of the data frame. i is any positive integer less than or equal to n, and n is a quantity of code blocks included in the payload area of the data frame. The determining a location of a code block that is in a received data frame and that carries the service data includes: receiving an indication field that is sent by a controller or a network manager and that carries identification information of the service data in the overhead area of the multiframe; and determining, based on the indication field that carries the identification information of the service data, the location of the code block that is in the data frame and that carries the service data.

The foregoing design provides another feasible manner of determining a location of a code block carrying service data. A plurality of data frames forms a multiframe, an indication field is configured in an overhead area of the multiframe, and a quantity of indication fields is the same as a quantity of code blocks included in a payload area of one data frame. If a code block carries the service data, an indication field that is in the overhead area and whose sequence number is correspondingly the same as a sequence number of the code block carries identification information of the service data, so that the receiver side can determine, based on the arrangement sequence number of the indication field that carries the identification information of the service data, a location of the code block carrying the service data.

In an embodiment, the overhead area of the multiframe further includes switching information, and the switching information is used to indicate that a location, in each data frame, of a service transmitted starting from a next multiframe period changes. The method further includes: when it is determined that the next multiframe period arrives, re-determining, based on the switching information, an indication field that is in an overhead area of a next multiframe and that carries the identification information of the service data; and obtaining, based on the indication field that carries the identification information of the service data, the service data from a payload area of a multiframe received starting from the next multiframe period.

In the solution provided in the embodiment of this application, a location for carrying the service data may be determined in a first multiframe in which the service data starts to be sent or in a first multiframe in which switching information is received each time. Before switching information is received next time, the service data is obtained from a data frame based on the location determined in the first multiframe. To shorten a delay time for restoring the service data, the first multiframe may be used only to determine a location of a code block carrying the service data, and service data in a payload area of the first multiframe is discarded.

In an embodiment, code blocks used for mapping the service data include an overhead code block and a data code block, the data code block is used to carry the service data, and the overhead code block includes clock information and/or time information of the service data mapped to a data frame in which the overhead code block is located.

In an embodiment, the indication field further includes indication information, and the indication information is used to indicate that a code block that is in the payload area of the data frame and whose arrangement location is the same as that of the indication field carrying the indication information is a data code block or an overhead code block.

In an embodiment, if a quantity of code blocks that are in the data frame and that are used for mapping the service data is less than a preset threshold, a code block that is used to carry the service data and that is included only in a first data frame in each multiframe includes the overhead code block.

In an embodiment, the code block is a 66B code block.

In an embodiment, the data frame is an optical data unit ODU frame, or the data frame is a flexible optical transport network FlexO frame.

In an embodiment, the data frame may further include fixed padding.

In an embodiment, the data frame includes a plurality of consecutive ODU frames, or the data frame includes a plurality of consecutive FlexO frames.

In an embodiment, the data frame is an ODU frame or a FlexO frame, the data frame includes a fixed slot area and a non-fixed slot area, and the code block is located in the non-fixed slot area.

According to a fourth aspect, an embodiment of this application provides a service data processing apparatus. The apparatus may be applied to a transmitter side, and includes a processor and a memory. The memory is configured to store program code. The processor is configured to read and execute the program code stored in the memory, to implement the method according to any one of the first aspect or the designs of the first aspect, or to implement the method according to any one of the second aspect or the designs of the second aspect.

According to a fifth aspect, an embodiment of this application provides a service data processing apparatus. The apparatus may be applied to a receiver side, and includes a processor and a memory. The memory is configured to store program code. The processor is configured to read and execute the program code stored in the memory, to implement the method according to any one of the third aspect or the designs of the third aspect.

According to a sixth aspect, an embodiment of this application provides a service data processing system. The system includes the apparatus according to the fourth aspect and the apparatus according to the fifth aspect.

According to a seventh aspect, an embodiment of this application further provides a computer storage medium. The storage medium stores a software program. When the software program is read and executed by one or more processors, the method provided in any design of any one of the first to the third aspects may be implemented.

According to an eighth aspect, an embodiment of this application provides a computer program product including an instruction. When the computer program product runs on a computer, the computer is enabled to perform the method provided in any design of the first aspect to the third aspect.

According to a ninth aspect, an embodiment of this application provides a chip. The chip is connected to a memory, and is configured to read and execute a software program stored in the memory, to implement the method provided in any design of the first aspect to the third aspect.

DESCRIPTION OF EMBODIMENTS

"A plurality of" mentioned in the embodiments of this application means two or more. The term "and/or" describes an association relationship for describing associated objects and represents that three relationships may exist. For example, A and/or B may represent the following three cases: Only A exists, both A and B exist, and only B exists.

In addition, it should be understood that, in the descriptions of this application, terms such as "first" and "second" are merely intended for a purpose of differentiated description, and shall not be understood as an indication or an implication of relative importance, or an indication or an implication of a sequence.

In the embodiments of this application, a mathematical symbol "*" or "x" represents a multiplication sign, "%" represents a modulo operation, and "⌊ ⌋" represents rounding down. For example, if A=3.9, ⌊A⌋=3. "#1" represents a first one, "#2" represents a second one, and so on.

The embodiments of this application are applicable to an optical network or a flexible Ethernet (FlexE) network.

Figure 1:
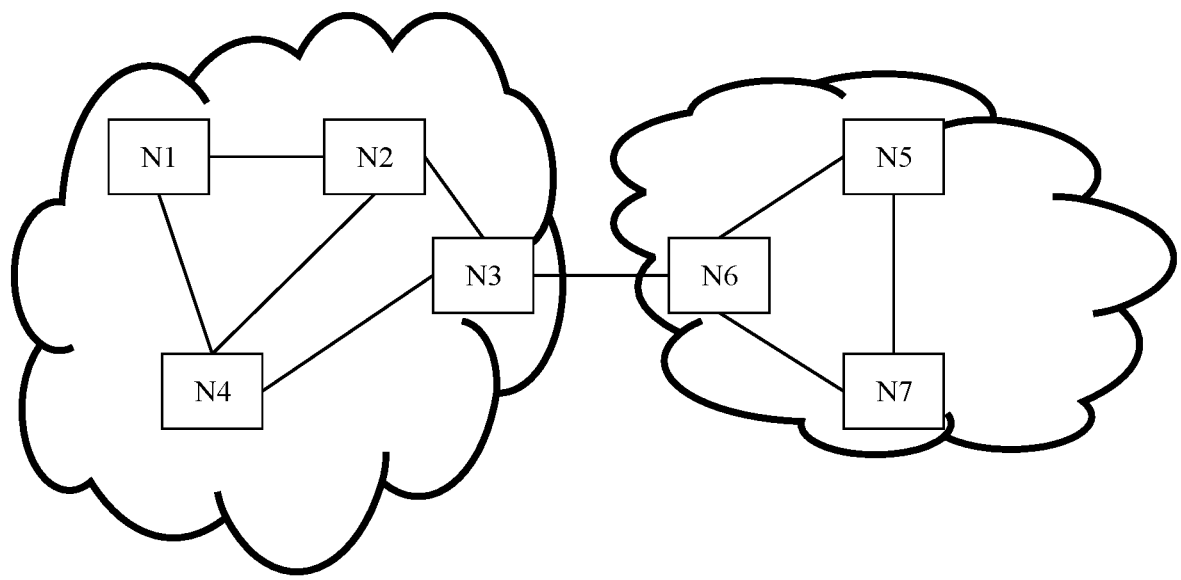
FIG. 1 is a schematic diagram of an OTN network architecture according to an embodiment of this application.

For an optical network, for example, an OTN, the OTN is usually formed by connecting a plurality of devices by using an optical fiber, and may be formed into different topology types such as a linear type, a ring type, and a mesh type according to a requirement. The OTN shown in FIG. 1 is formed by two OTN networks. Each OTN network includes a quantity of OTN devices (N1 to N7). An OTN device may have different functions according to actual requirements. Generally, OTN devices are classified into an optical-layer device, an electrical-layer devices, and a photoelectric hybrid device. The optical-layer device is a device capable of processing an optical-layer signal, for example, an optical amplifier (OA) or an optical add-drop multiplexer (OADM). The OA may also be referred to as an optical line amplifier (OLA), and is mainly configured to amplify an optical signal, to support a longer transmission distance while ensuring a performance of the optical signal. The OADM is configured to perform space transformation on an optical signal, so that the optical signal may be output from different output ports (which are also referred to as directions sometimes). Based on different capabilities, OADMs may be classified into a fixed OADM (FOADM), a reconfigurable OADM (ROADM), and the like. The electrical-layer device is a device capable of processing an electrical-layer signal, for example, a device capable of processing an OTN signal. The photoelectric hybrid device is a device capable of processing an optical-layer signal and an electrical-layer signal. It should be noted that one OTN device may integrate a plurality of different functions according to an integration requirement. The technical solutions provided in this application are applicable to OTN devices in different forms and at different integration levels. The optical network may further include a controller or a network manager, configured to manage the OTN device in the optical network.

Figure 2:
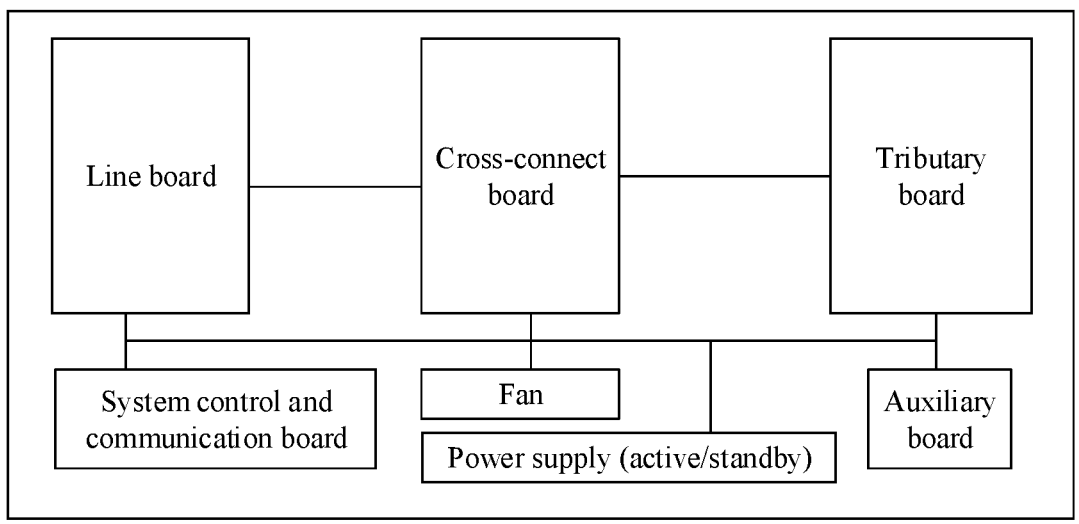
FIG. 2 is a schematic diagram of a structure of an OTN device according to an embodiment of this application.

FIG. 2 is a schematic diagram of a possible hardware structure of an OTN device. The OTN device herein may be any one of N1 to N7 in FIG. 1. In an embodiment, an OTN device includes a power supply, a fan, and an auxiliary board, and may further include a tributary board, a line board, a cross-connect board, an optical-layer processing board, and a system control and communication board.

It should be noted that each device may include a different type of board and a different quantity of boards according to an actual requirement. For example, a network device serving as a core node may have no tributary board. A network device serving as an edge node may have a plurality of tributary boards. The power supply is configured to supply power to the OTN device, and may include a primary power supply and a secondary power supply. The fan is configured to dissipate heat for the device. The auxiliary board is configured to provide an auxiliary function, for example, providing an external alarm or accessing an external clock. The tributary board, the cross-connect board, and the line board are mainly configured to process an electrical-layer signal of an OTN. The tributary board is configured to send and receive various client services, for example, an SDH service, a packet service, an Ethernet service, and a fronthaul service. Further, the tributary board may be divided into a client-side optical module and a signal processor. The client-side optical module may be an optical transceiver, and is configured to send and/or receive service data. The signal processor is configured to map service data to a data frame, or demap service data from a data frame. The cross-connect board is configured to exchange a data frame, and exchange one or more types of data frames. The line board mainly processes a line-side data frame. In an embodiment, the line board may be divided into a line-side optical module and a signal processor. The line-side optical module may be a line-side optical transceiver, and is configured to send and/or receive a data frame. The signal processor is configured to multiplex or demultiplex, or map or demap a line-side data frame. The system control and communication board is configured to implement system control and communication. In an embodiment, a backplane may be used to collect information from different boards, or send a control instruction to a corresponding board. It should be noted that there may be one or more components, unless otherwise specified. This is not limited in this application. It should be further noted that a type of a board included in the device, a function design of a board, and a quantity of boards are not limited in this embodiment of this application.

In addition, a data frame used by the OTN device in this embodiment of this application may be an OTN frame, or the data frame includes a plurality of OTN frames, and is used for mapping various types of service data, so that the service data can be managed and monitored. The OTN frame may be an optical data unit (ODU) k, an ODUCn, an ODUflex, an optical transport unit (OTU) k, an OTUCn, a flexible OTN (FlexO) frame, or the like. The FlexO frame may be a FlexO-short reach SR) interface frame or a FlexO-long reach (LR) interface frame. The data frame may be alternatively another frame structure applicable to an optical network.

Figure 3A:
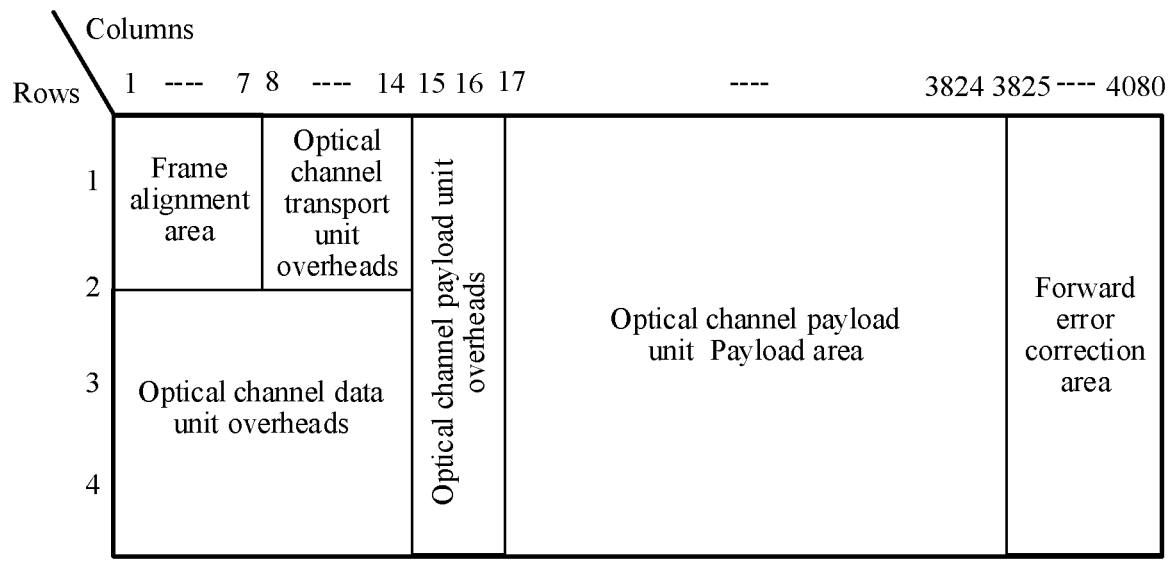
FIG. 3A is a schematic diagram of an OTN frame according to an embodiment of this application.

In an example, as shown in FIG. 3A, the OTN frame may be in a structure of 4×4080 bytes, namely, 4 rows×4080 columns. The OTN frame structure includes a frame alignment area, an OUT overhead (OH), an ODUOH, an optical channel payload unit (OPU) OH, an OPU payload area, and an FEC area. The first 16 columns form an overhead area, the last 256 columns form an FEC area, and the middle 3808 columns form a payload area. It should be noted that the OTN frame may alternatively not include a check area of the last 256 columns.

The frame alignment overhead may include two parts: a frame alignment signal (FAS) and a multiframe alignment signal (MFAS). A plurality of OTN frames form one OTN multiframe. For example, eight OTN frames form one OTN multiframe.

An OPUk is used to carry service data, and includes an OPU payload area and an OPU OH, where k represents a rate level of the OPU. k=0, 1, 2, 3, and 4 respectively corresponds to 1.25 G, 2.5 G, 10 G, 40 G, and 100 G. k=flex, namely, an OPUflex, may correspond to any rate level, and the OPUflex is used to carry only one channel of services. k=Cn, namely, an OPUCn, corresponds to a rate level that is n times of 100 G.

An ODUk is an information structure used to support an OPUk, and includes the OPUk and an ODUk OH. Similarly, a capacity of the ODUk is distinguished by k. An ODUflex includes an OPUflex and an ODUflex OH. An OTUk includes an ODUk, an FEC area, and an OTUk OH. An OTUCn includes an ODUCn and an OTUCn OH, and does not include an FEC area.

In addition, it should be noted that a low-rate service in the embodiments of this application is a service whose rate is less than a rate of an ODU0. The rate of the ODU0 is 1.25 Gbps.

Figure 3B:
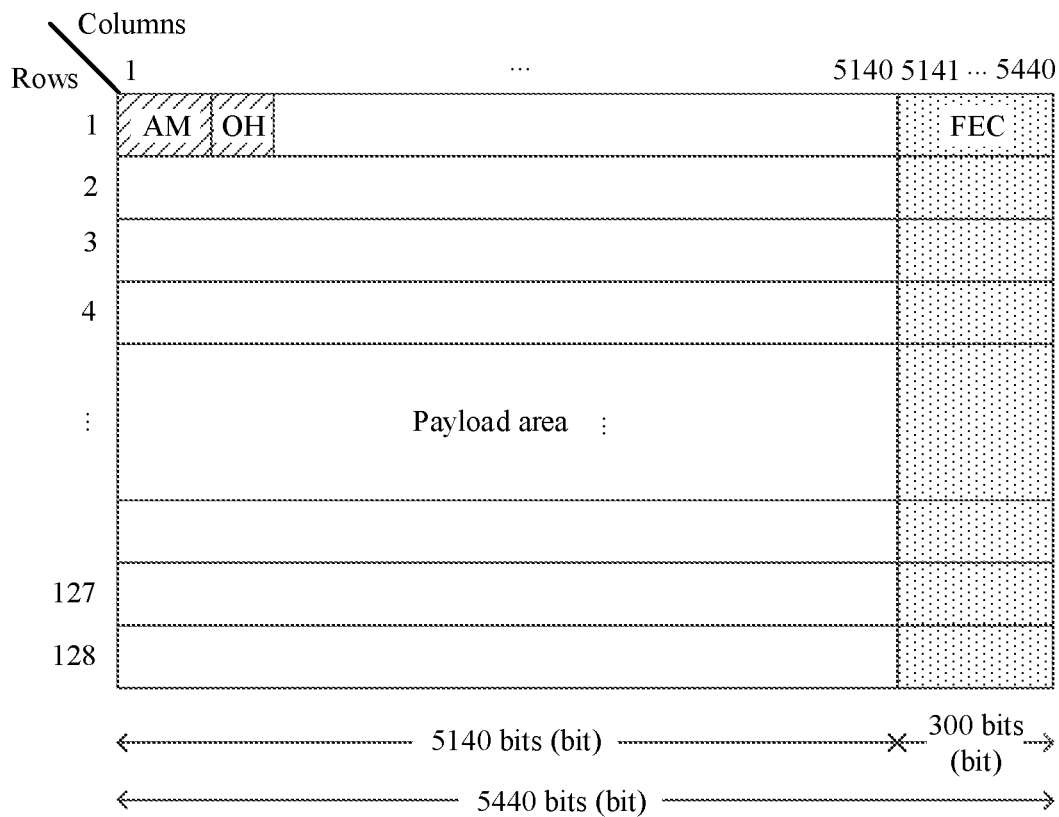
FIG. 3B is a schematic diagram of a FlexO frame according to an embodiment of this application.

In another example, as shown in FIG. 3B, the FlexO-SR frame is in a structure of 128×5440 bits. A structure of 5440 bits in a first row in the frame structure includes an alignment marker (AM) area and an OH area. The last 300 bits of 5440 bits in each row form an FEC area. Other than the AM area, the overhead area, and the FEC area, remaining bits form a payload area. It should be noted that in this embodiment of this application, a plurality of FlexO-SRs may form one FlexO-SR multiframe. For example, eight FlexO-SRs form one multiframe. Therefore, an overhead structure of a FlexO-SR multiframe may be formed by using an overhead combination of eight FlexO-SRs. In an embodiment, an MFAS may be defined to indicate each frame in the multiframe.

To be applicable to a low-rate service, this embodiment of this application provides a structure with a smaller granularity than a data frame. The structure is carried in a data frame. The structure may be referred to as a code block. To be specific, the data frame is divided into a plurality of code blocks. Certainly, the structure may be alternatively named another name. This is not specifically limited in this embodiment of this application. The code block may be a 66-bit (bit, B) code block, or the code block may be a code block that occupies another quantity of bits, but a rate of the code block is less than 1 Gbps, for example, 128 bits or 256 bits. The low-rate service may be a synchronous transfer module-1

(STM-1) signal of an SDH, or a virtual container (VC)-12, VC-3, or VC-4 granularity for parsing an STM-1 signal, or may be a fast Ethernet (FE) service in an Ethernet service, or the like. VC-n represents an order-n virtual container. For example, n=3 represents an order-3 virtual container.

When a data frame is divided into code blocks, the OTN frame shown in FIG. 3A is used as an example for description. A division manner for a FlexO frame is similar to the division manner for the OTN frame shown in FIG. 3A. Details are not described herein again.

Figure 4A:
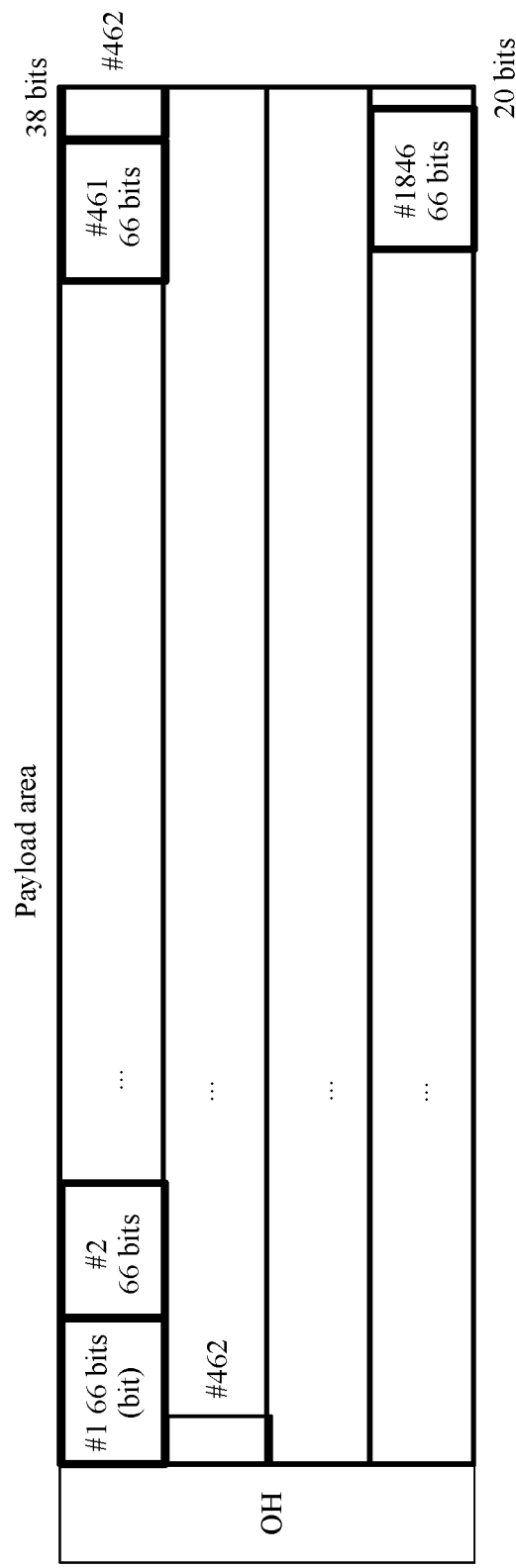
FIG. 4A is a schematic diagram of a structure of dividing an OTN frame into code blocks according to an embodiment of this application.
Figure 4B:
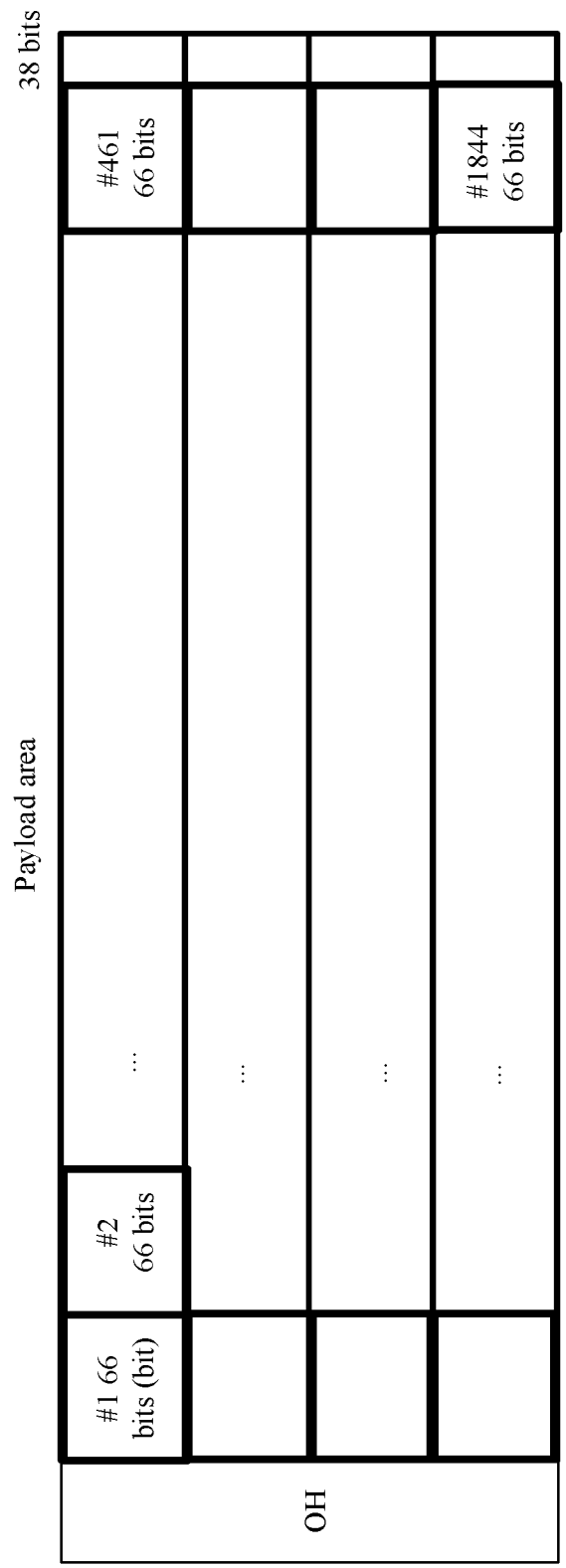
FIG. 4B is another schematic diagram of a structure of dividing an OTN frame into code blocks according to an embodiment of this application.

In a first possible division manner, when a code block is configured for a data frame, if a quantity of bits occupied by a payload area of a data frame cannot be exactly divided by a quantity of bits occupied by a code block, a bit remaining after exact division may be inserted into fixed padding, and is not used for transmitting service data. When a data frame is an OTN frame, for example, as shown in FIG. 3A, a payload area of an OTN frame occupies 4×3808×8 bits, and a code block is 66B, ⌊4×3808×8/66⌋=1846, and 4×3808×8% 66=20. In this case, 1846 code blocks are configured in the OTN frame, and remaining 20 bits are used as fixed padding, as shown in FIG. 4A. In another embodiment, when a data frame is an OTN frame, a fixed padding column may be alternatively configured. For example, for each row, ⌊3808×8/66⌋=461, and 3808×8% 66=38. In this case, 461 code blocks are configured in each row of a payload area of the OTN frame, and the last 38 bits in each row of the payload area are used as fixed padding, as shown in FIG. 4B.

Figure 5:
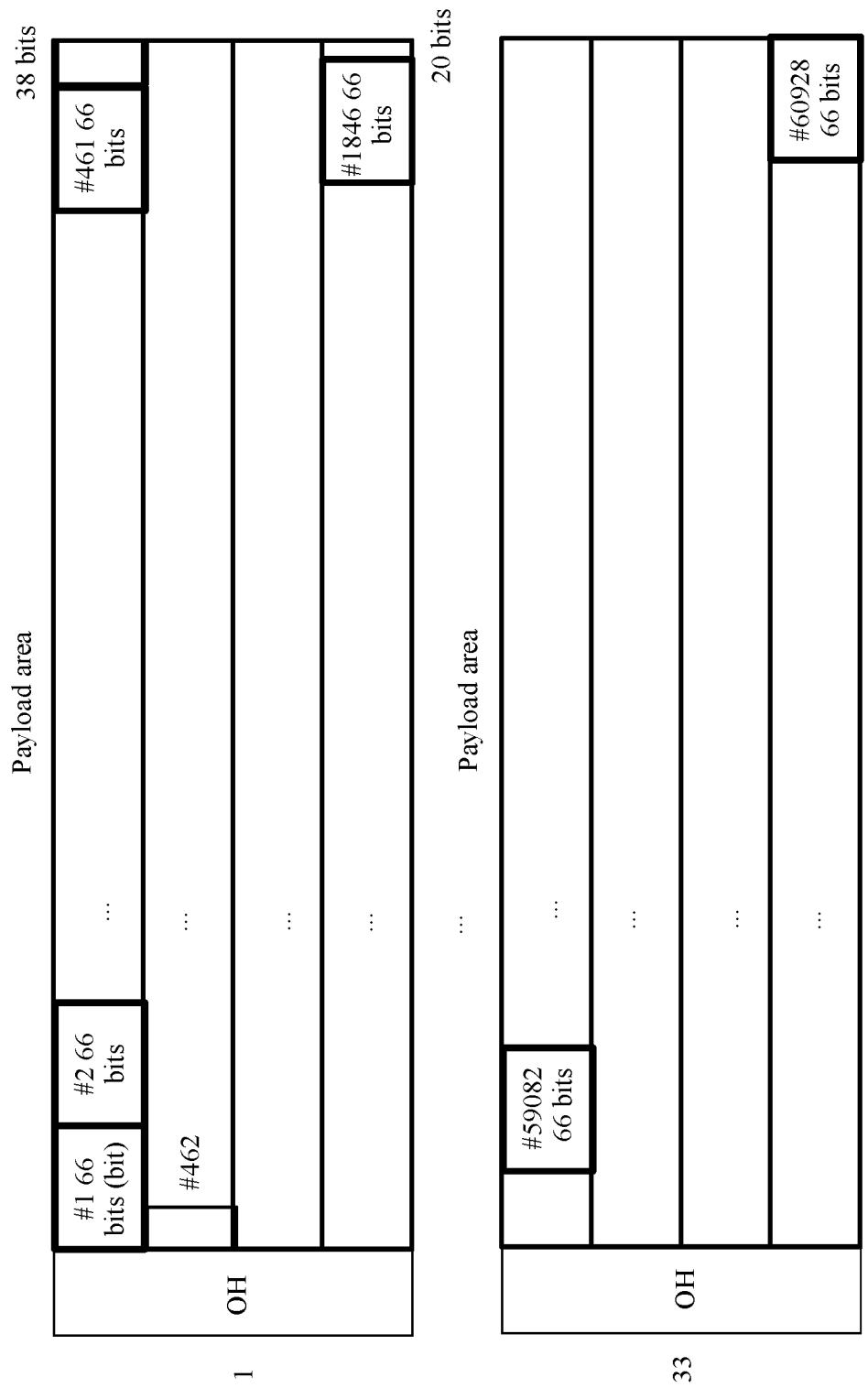
FIG. 5 is a schematic diagram of a structure of dividing a plurality of OTN frames into code blocks according to an embodiment of this application.

In a second possible division manner, when a quantity of bits occupied by one OTN frame cannot be exactly divided by a quantity of bits occupied by a code block, if quantities of bits occupied by several OTN frames can be exactly divided by the quantity of bits occupied by the code block, code blocks may be divided by using a plurality of OTN frames as a whole (in other words, as one data frame). Using the OTN frame shown in FIG. 3A as an example, a payload area of the OTN frame occupies 4×3808×8 bits. For example, a code block is 66B. ⌊33×4×3808×8/66⌋=60928, and 33×4×3808×8% 66=0. In this case, a quantity of bits occupied by payload areas of 33 OTN frames can be exactly divided by 66, so that the 33 OTN frames may be used as a whole (one data frame) to be divided into 60928 code blocks, as shown in FIG. 5.

Figure 6:
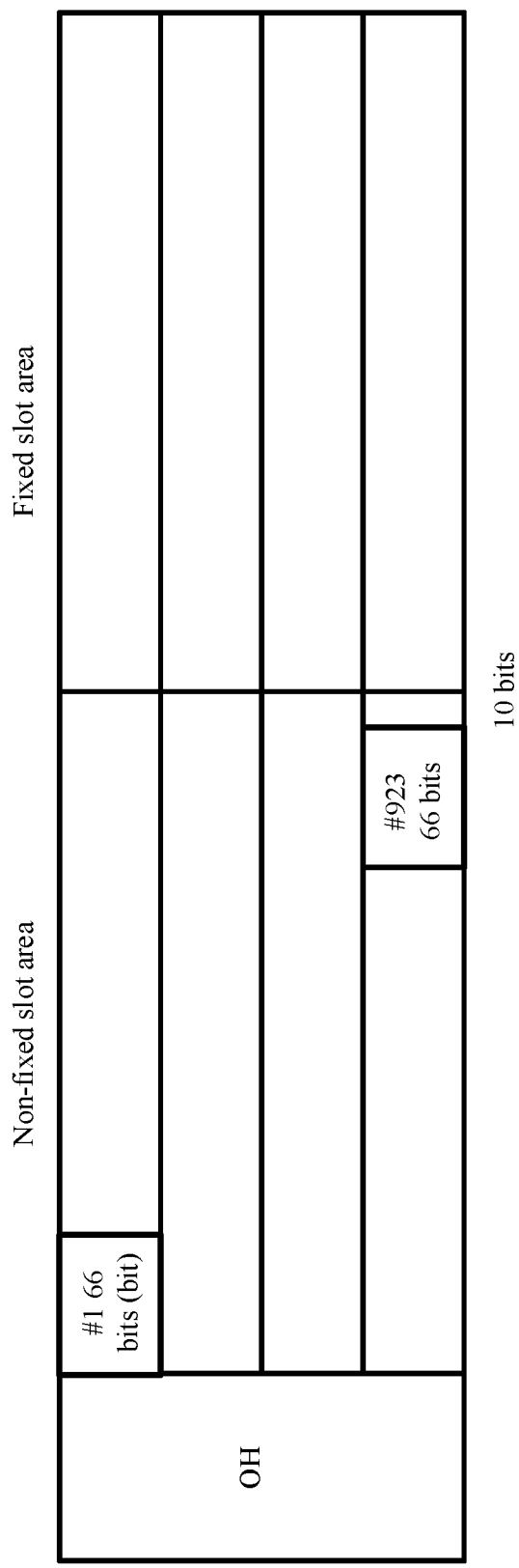
FIG. 6 is still another schematic diagram of a structure of dividing an OTN frame into code blocks according to an embodiment of this application.

In a third possible division manner, a payload area of an OTN frame may be divided into a fixed slot area and a non-fixed slot area, and a code block is obtained through division in the non-fixed slot area. FIG. 6 shows an example. In a payload area of 4×3808×8 bits in an OTN frame, the first half is used as a non-fixed slot area, and the second half is used as a fixed slot area. To be specific, the first 4×1904×8 bits of the payload area are used as the non-fixed slot area, and the last 4×1904×8 bits are used as the fixed slot area. If the quantity of bits occupied by the non-fixed slot area cannot be exactly divided by a quantity of bits occupied by a code block, fixed padding may be configured. For example, as shown in FIG. 6, 4×1904×8% 66=10. Therefore, the non-fixed slot area includes 10-bit fixed padding.

In the foregoing three manners of configuring a code block for a data frame, after service data is mapped to a data frame, a receiving node (an OTN device serving as a receiver side) needs to know one or more code blocks to which service data corresponding to a service is mapped. Therefore, the receiving node needs to know a location of the service data of the service in a payload area of the data frame. Based on this, a service data processing method and apparatus provided in the embodiments of this application are implemented in two manners. In a first manner, a data code block and an overhead code block are distinguished from each other in code blocks in a payload area of a data frame. The data code block is used to carry service data, and the overhead code block is used to indicate a location of a code block to which the service data is mapped. In a second manner, an indication field is configured in an overhead area of a data frame, and the indication field is used to indicate a location of a code block carrying service data.

Based on some common aspects of the foregoing descriptions of this application, the following further describes the embodiments of this application in detail.

Figure 7:
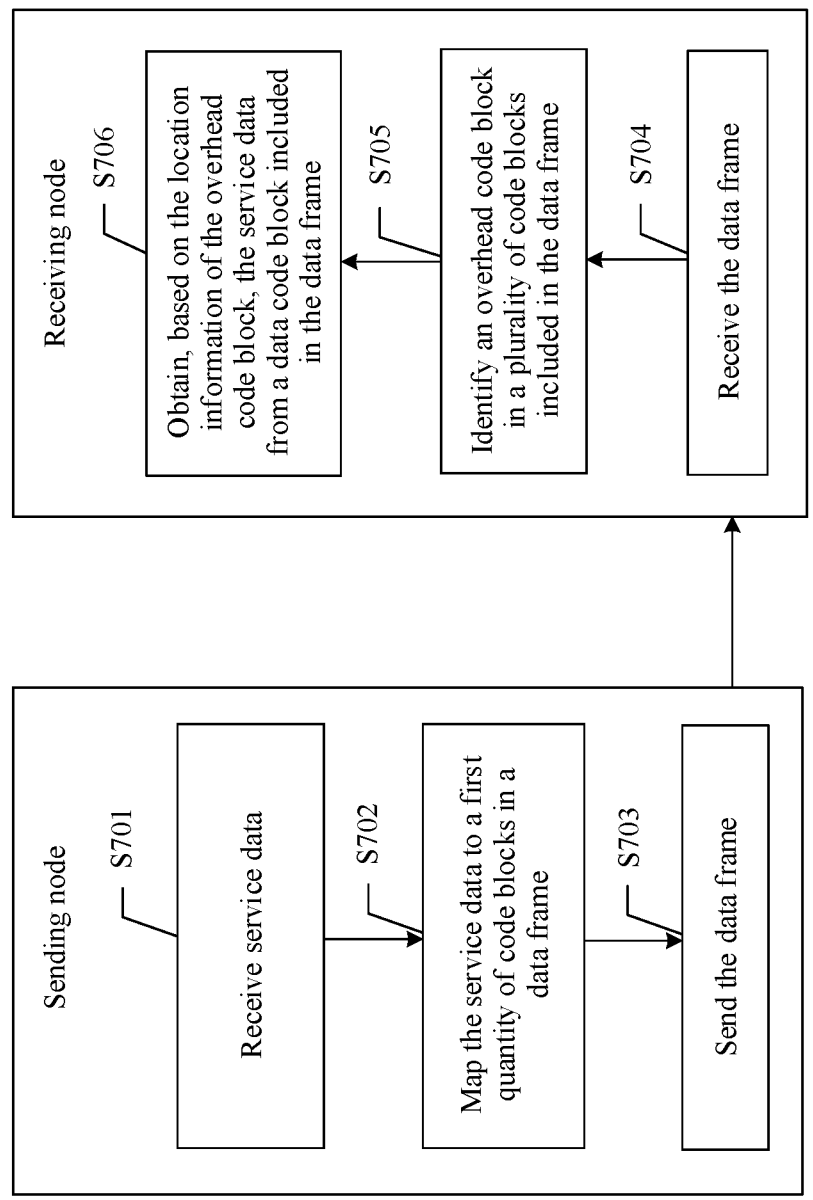
FIG. 7 is a schematic flowchart of a service data processing method according to an embodiment of this application.

FIG. 7 shows a service data processing method in the first manner. The method includes the following operations.

S701: A sending node (an OTN device on a transmitter side) receives service data.

S702: The sending node maps the service data to a first quantity of code blocks in a data frame.

The first quantity of code blocks includes an overhead code block and a data code block. The data code block is used to carry the service data, and the overhead code block includes location information of the data code block used to carry the service data. The overhead code block may further include quantity information of the data code block carrying the service data, in other words, indicate the first quantity.

S703: The sending node sends the data frame to a receiving node.

After receiving the data frame, the receiving node determines a location of a code block that is in the data frame and that carries the service data, and obtains the service data from the code block that corresponds to the location and that is included in a payload area of the data frame. In an embodiment, in the first manner, the receiving node obtains the service data in the following manner.

S704: The receiving node receives the data frame.

S705: The receiving node identifies an overhead code block in a plurality of code blocks included in the data frame. The overhead code block includes the location information of the data code block used to carry the service data. The overhead code block may further include the quantity information of the data code block carrying the service data. When the overhead code block includes only the location information, a quantity of data code blocks may be obtained based on the location information. For example, when there are locations of three data code blocks, it may be determined that there are three data code blocks carrying the service data.

The overhead code block may further include identification information of the service data, to determine, based on the identification information of the service data in the overhead code block, which type of service data is carried by a code block indicated by the location information included in the overhead code block.

S706: The receiving node obtains, based on the location information of the overhead code block, the service data from the data code block included in the data frame.

Figure 8:
FIG. 8 is a schematic diagram of a structure of an idle code block according to an embodiment of this application.

For example, when mapping the service data to the first quantity of code blocks in the data frame, the sending node may implement the mapping in an idle mapping procedure (IMP) manner or a generic mapping procedure (GMP) manner. For example, for a packet (PKT) service, mapping may be implemented in the IMP manner. When the mapping is performed in the IMP manner, an idle (IDLE) code block may need to be inserted to perform rate adaptation between the service data and the data frame. In an embodiment, the idle code block may be inserted between 66B code blocks obtained by transcoding the service data. In an example, for a structure of the idle code block, refer to FIG. 8. For a constant bit rate (CBR) service, for example, a time division multiplexing (TDM) service, mapping may be implemented in the GMP manner. The TDM service may be a synchronous digital hierarchy (SDH), a video serial digital interface (SDI), a transparently transmitted Ethernet bit stream, or the like.

It should be understood that the mapping in this embodiment of this application may be a direct mapping. For example, the service data is mapped to a data frame such as an ODUflex, an OTNCn, or a FlexO. Alternatively, the mapping may be a multi-layer mapping. For example, the service data is mapped to an ODUflex data frame, then the ODUflex is mapped to an OTUCn, and then the OTUCn is sent to the receiving node. For the multi-layer mapping, the data frame may be an ODUO, an ODUflex, or the like. If the multi-layer mapping is used, in the operation S702, after mapping the service data to the first quantity of code blocks in the data frame, the sending node maps the data frame to another data frame (for example, an ODUCn frame or a FlexO frame). Correspondingly, the sending, by the sending node, the data frame in the operation S703 is: sending the ODUCn frame, the FlexO frame, or the like to the receiving node. Correspondingly, the receiving, by the receiving node, the data frame is: receiving the ODUCn frame, the FlexO frame, or the like, and demapping the ODUO and the ODUflex from the ODUCn frame, the FlexO frame, or the like. Then an overhead code block included in the ODUO frame or the ODUflex frame is identified, and the service data is further obtained, based on the quantity information, from the data code block included in the data frame.

Figure 9A:
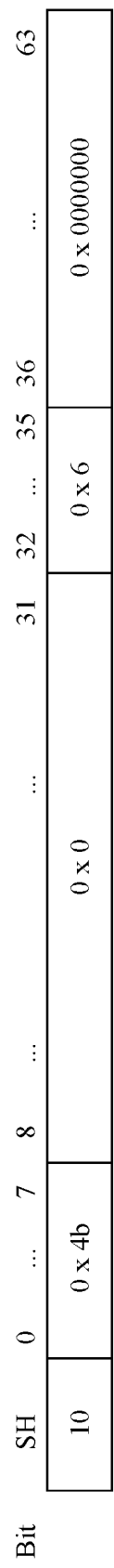
FIG. 9A is a schematic diagram of a structure of an overhead code block according to an embodiment of this application.

For example, a structure of the overhead code block in this embodiment of this application may be implemented by extending an O code block. FIG. 9A shows a structure of the O code block. SH is a synchronization header. A value of the synchronization header is a binary value 10, and is used to indicate that the code block is a control code block. Bits 0 to 7 are used to indicate a code block type, and a value of the bits is 0x4B. A value of bits 32 to 35 is 0x6. A combination of the bits 0 to 7 and the bits 32 to 35 is used to indicate that the code block type is a type of O code block, and the O code block is a code block type applied to Ethernet. Bits 8 to 31 and bits 36 to 63 of the code block are used to define a monitoring overhead. In this embodiment of this application, the structure of the O code block may be applied to an overhead code block, and a code block location field is defined in the bits 8 to 31 and the bits 36 to 63, to carry location information and quantity information of a data code block that corresponds to the overhead code block and that is in the data frame. In an embodiment, the overhead code block may further include at least one of the following fields: a label field, a check (CRC) field, a reserved (Reserve) field, and a timestamp field. The label field is used to carry the identification information of the service data. The check field is used to check correctness of the code block, for example, is used to check correctness of one or more fields of the check code block. The reserved field is used to further define a monitoring overhead, set a multiframe period, or the like. The timestamp field is used to require clock restoration of a clock and/or time transparent transmission service, and is used to carry time information and/or clock information of a service data mapping. In addition, it should be noted that a quantity of bits occupied by each field of an overhead code block in any embodiment of this application may be configured as required. This is not specifically limited in this application.

Figure 9B:
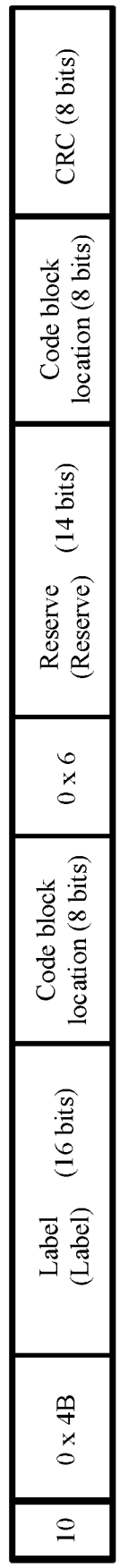
FIG. 9B is a schematic diagram of a structure of another overhead code block according to an embodiment of this application.
Figure 9C:
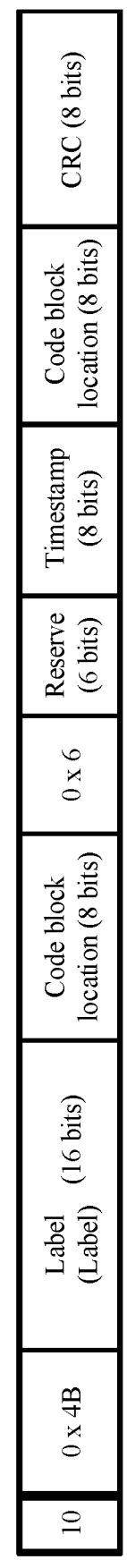
FIG. 9C is a schematic diagram of a structure of still another overhead code block according to an embodiment of this application.

For example, FIG. 9B shows an example of a structure of a 66B overhead code block. A label (Label) field occupies 16 bits. A code block location field is divided into two parts, and occupies a total of 16 bits. A check field occupies 8 bits. A reserved(RES) field occupies 12 bits. For another example, FIG. 9C shows an example of a structure of a 66B overhead code block. A label (Label) field occupies 16 bits. A code block location field is divided into two parts, and occupies a total of 16 bits. A check field occupies 8 bits. A timestamp field occupies 8 bits. A reserved field occupies 4 bits. Certainly, in this embodiment of this application, the two parts of the code block location field may be alternatively combined into one part. In addition, FIG. 9B and FIG. 9C are merely used as examples of a structure of an overhead code block, and do not constitute a limitation on a structure of an overhead code block.

Figure 10:
FIG. 10 is a schematic diagram of a quantity of code blocks occupied by service data according to an embodiment of this application.

In an example, in this embodiment of this application, when the first quantity of code blocks occupied by the service data is determined, the first quantity of code blocks occupied by the service data may be determined based on a rate required by a service corresponding to the service data and a rate of the data frame. For example, a payload area of the ODUflex frame is divided into an integer quantity of 66B code blocks, and a rate of each code block is represented as ODUflex.66b. Assuming that the rate of the ODUflex is m, a rate of each code block is ODUflex.66b=m×66/(3824×4×8), and an effective service rate provided by each code block is ODUflex.66b×64/66. Based on a rate of a low-rate service that needs to be carried, it may be determined that a quantity of 66B data code blocks required for carrying the service data is d=(the rate required by the service/(ODUflex.66b×64/66)). Then a 66B overhead code block is added. Therefore, it is determined that the first quantity of code blocks occupied by the service data is d+1. For example, as shown in FIG. 10, d is 3.

In an embodiment, a distribution location of the first quantity of code blocks in the payload area of the data frame may be statically configured. For example, a controller or a network manager that manages the sending node configures, for the service, a location of a code block used for mapping the service data, and sends the location to the sending node. Alternatively, a distribution location of the first quantity of code blocks in the payload area of the data frame may be dynamic, and a bandwidth allocation algorithm is configured for each sending node in advance, so that the sending node determines, based on the bandwidth allocation algorithm, a location of a code block that is in the data frame and to which the service data is mapped. The bandwidth allocation algorithm can ensure that code blocks to which service data of each sending node is mapped are distributed in the data frame as evenly as possible.

Figure 11:
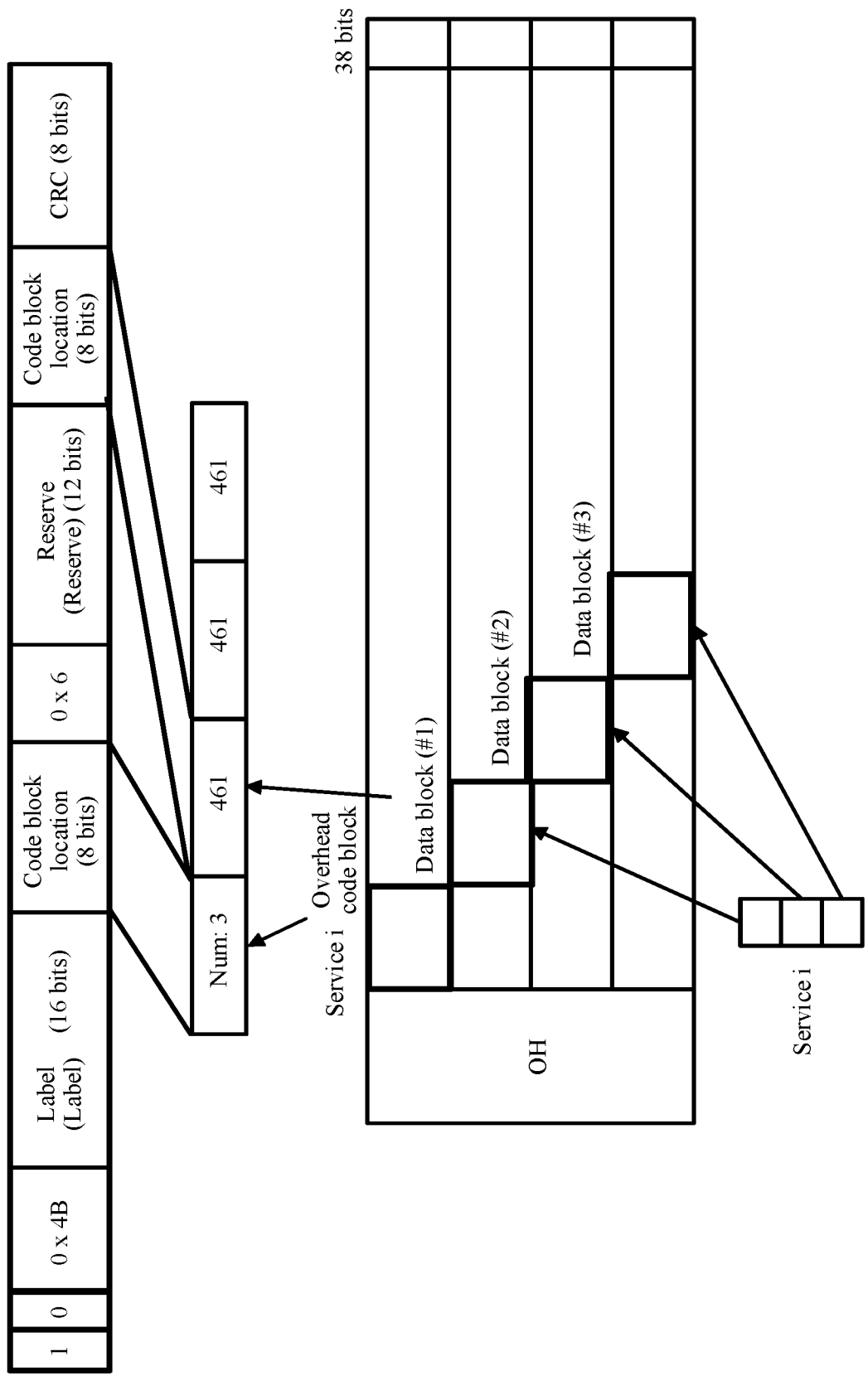
FIG. 11 is a schematic diagram of location information and quantity information added to an overhead code block according to an embodiment of this application.

As described above, the determined location information of the data code block to which the service data is mapped may be added to an overhead code block corresponding to the service. For example, if a quantity of bits occupied by a code block location field defined by the overhead code block is insufficient to indicate a location of the first quantity of code blocks, the location may be indicated in a form of a multiframe. For example, n is 3. Two data frames may be used as two overhead code blocks in a multiframe to indicate a location of a data code block that is in each data frame and that is used for mapping the service data, and may further indicate a quantity of data code blocks. In an embodiment, to reduce a quantity of bits occupied by location information, the location information may be a location, relative to a previous code block, of a code block carrying the service data, for example, a location of a first data code block relative to the overhead code block, a location of a second data code block relative to the first data code block, and so on. For example, as shown in FIG. 11, the structure of the overhead code block shown in FIG. 9B is used as an example, and that a data frame is an OTN frame is used as an example. In a first OTN frame of an OTN multiframe, a first code block location field is used to carry the quantity information of the data code block used for mapping the service data, and a second code block location field is used to carry relative location information of the first data code block and the overhead code block, namely, a quantity of code blocks between the first data code block and the overhead code block. In a second OTN frame of the OTN multiframe, a first code block location field is used to carry relative location information of a second data code block and the first data code block, and a second code block location field is used to carry relative location information of a third data code block and the second data code block. Therefore, after receiving the OTN frame, the receiving node determines the overhead code block in the OTN frame, and determines, based on the location information carried in the location fields in the overhead code block, the location of the code block carrying the service data, to restore the service data.

Figure 12:
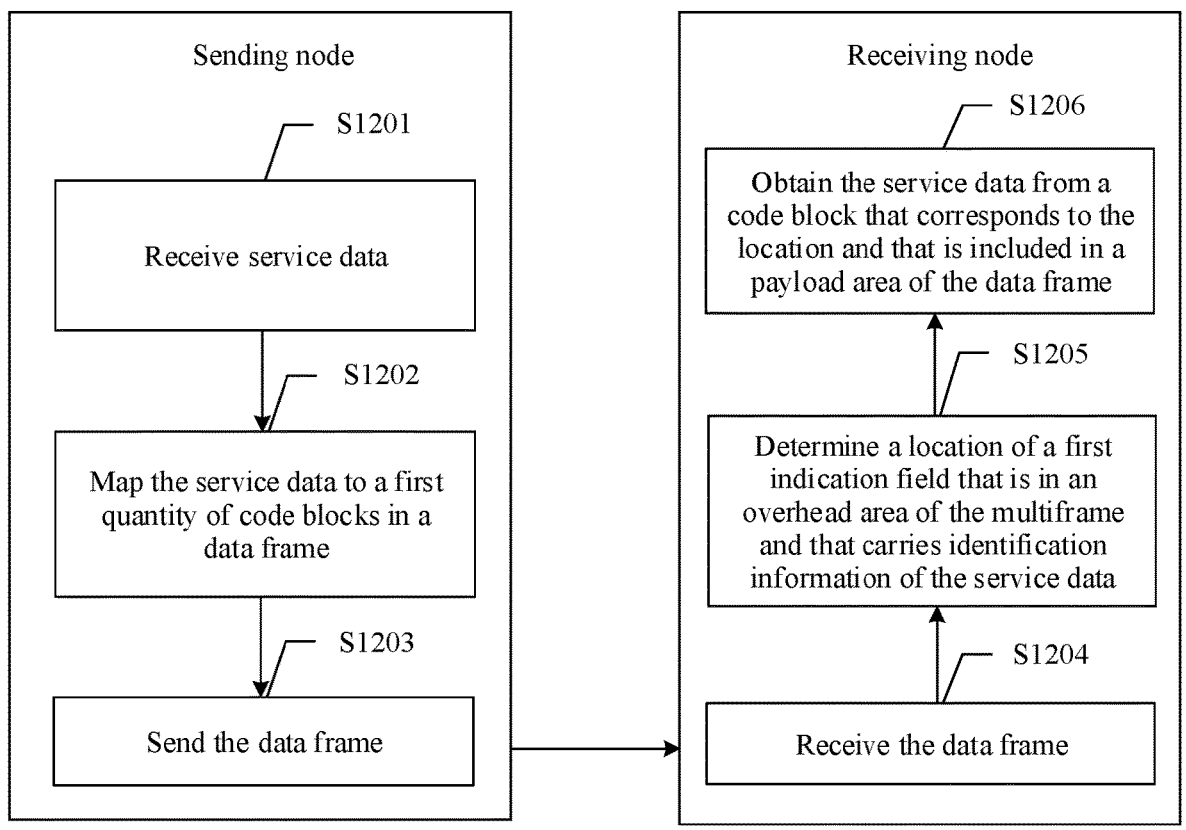
FIG. 12 is a schematic flowchart of another service data processing method according to an embodiment of this application.

FIG. 12 shows a service data processing method in the second manner. In the second manner, an indication field is configured in an overhead area, and the indication field is used to indicate a location, in a data frame, of a code block carrying service data. In an embodiment, the method provided in FIG. 12 includes the following operations.

S1201: A sending node receives service data.

S1202: The sending node maps the service data to a first quantity of code blocks in a data frame.

The first quantity of code blocks is used for mapping the service data. An overhead area of the data frame includes at least one first indication field. The first indication field are used to indicate a location of a code block carrying the service data.

Figure 13:
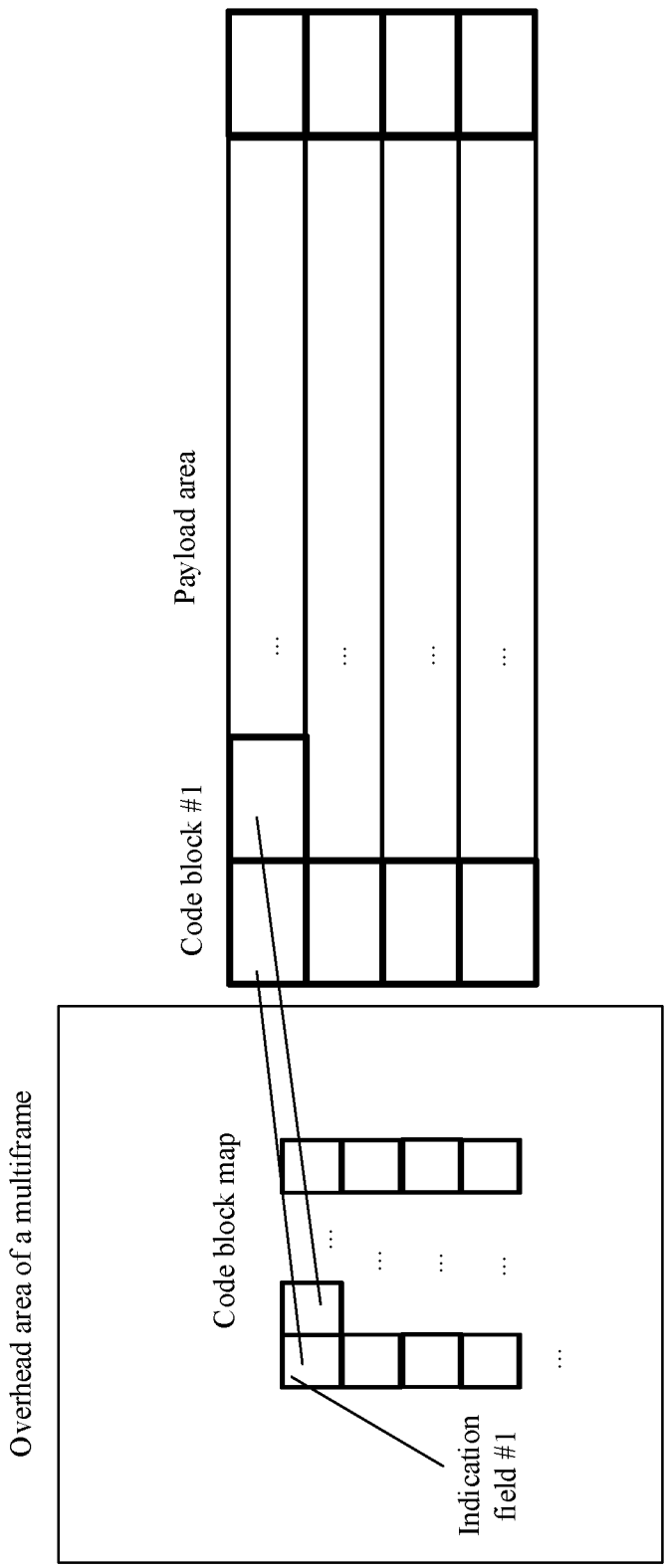
FIG. 13 is a schematic diagram of a structure of a correspondence between a code block map and a code block according to an embodiment of this application.

In an embodiment, when a quantity of indication fields included in a data frame is less than a quantity of code blocks included in the data frame, a plurality of consecutive data frames may form a multiframe, so that a quantity of code blocks included in a payload area of each data frame is the same as a quantity of indication fields included in an overhead area of the multiframe. In this embodiment, for ease of description, an indication field that carries identification information of the service data and that is among indication fields included in the overhead area of the multiframe is referred to as the first indication field. The first indication field includes the identification information of the service data. An $i^{th}$ indication field of the multiframe includes identification information of service data carried by an $i^{th}$ code block in the payload area of the data frame. i is any positive integer less than or equal to n, and n is a quantity of code blocks included in the payload area of the data frame. Using the first indication field that carries the service data as an example, after all indication fields in the multiframe are sorted, arrangement sequence numbers of a first quantity of first indication fields that include the identification information of the service data and that are in the multiframe are the same as, in a one-to-one correspondence, sequence numbers of code blocks carrying the service data and that are in the payload area of the data frame. Referring to FIG. 13, after the indication fields included in the multiframe are sorted, for ease of description, a plurality of sorted indication fields in the multiframe are referred to as a code block map. A first indication field (an indication field #1) in the code block map is used to indicate which type of service data is carried by a first code block in the data frame, a second indication field is used to indicate which type of service data is carried by a second code block in the data frame, and so on.

Figure 14:
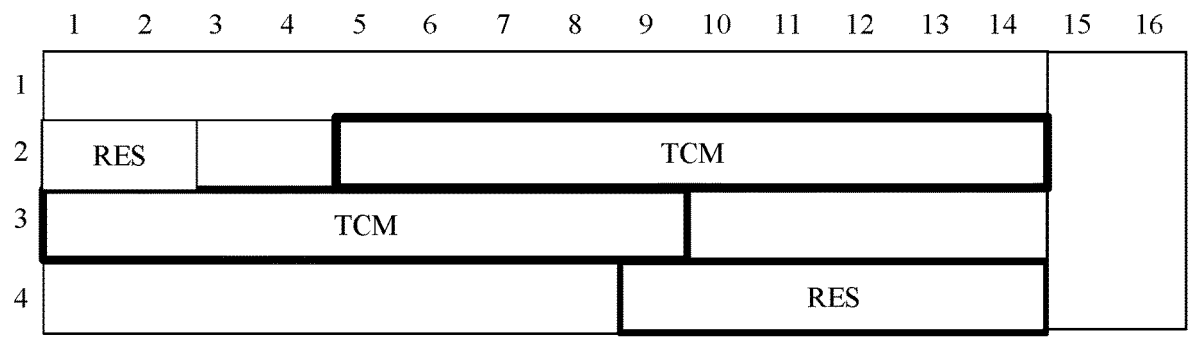
FIG. 14 is a schematic diagram of a location that is in an overhead area and that can be occupied by an indication field according to an embodiment of this application.

For example, as shown in FIG. 14, indication fields may occupy a tandem connection monitor (TCM) field and a reserved field in an overhead area of an ODUflex, for example, areas circled by bold black boxes in FIG. 14, including a total of 24 bytes. RES in FIG. 14 indicates the reserved field. Two bytes are used as an indication field to carry identification information of service data of a service. In this case, one ODUflex can include 12 indication fields. For example, one data frame is one ODUflex, and one ODUflex can be divided into 1844 66B code blocks. Therefore, an overhead area of 154 ODUflex frames is required to indicate service data carried by a code block in a payload area of one ODUflex frame.

Figure 15:
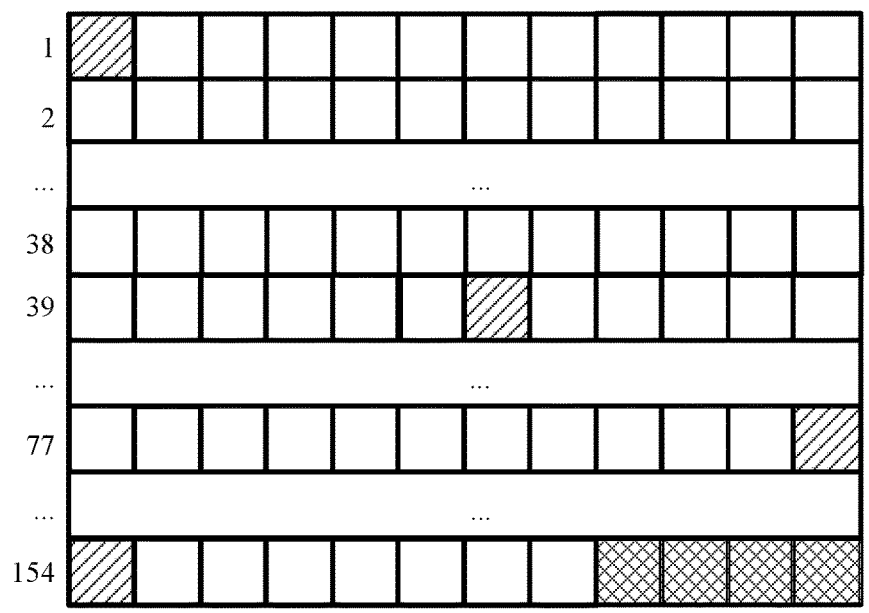
FIG. 15 is a schematic diagram of a structure of a code block map including an indication field in an overhead area of a multiframe according to an embodiment of this application.

A service i is used as an example. Referring to FIG. 11, 12×154=1848 indication fields included in a multiframe including 154 ODUflex form a code block map. In an embodiment, only 1844 indication fields in the code block map are required to indicate locations of 1844 code blocks, and the remaining four indication fields may be used as invalid padding. Service data corresponding to the service i occupies a first code block, a $463^{th}$ code block, a $925^{th}$ code block, and a $1387^{th}$ code block in a payload area of each ODUflex. Therefore, in the code block map formed by the indication fields included in an overhead area of the multiframe, a first indication field, a $463^{th}$ indication field, a $925^{th}$ indication field, and a $1387^{th}$ indication field all include identification information of the service i, as shown in FIG. 15.

S1203: The sending node sends the data frame to a receiving node.

After receiving the data frame, the receiving node determines a location of a code block that is in the data frame and that carries the service data, and obtains the service data from the code block that corresponds to the location and that is included in a payload area of the data frame. A plurality of consecutive data frames form a multiframe, and a quantity of indication fields included in an overhead area of the multiframe is the same as a quantity of code blocks included in each data frame.

In an embodiment, the receiving node may determine, based on a code block map in the overhead area of the multiframe, a location of a code block carrying service data. In another possible implementation, location information of the code block carrying the service data may be preconfigured on the receiving node, so that the receiving node learns, based on the configured location information, the location of the code block carrying the service data.

In an embodiment, the receiving node performs the following steps.

S1204: The receiving node receives the data frame.

S1205: The receiving node determines a location of a first indication field that is in the overhead area of the multiframe and that carries the identification information of the service data.

S1206: The receiving node obtains the service data from the code block that corresponds to the location and that is included in the payload area of the data frame.

For example, the code block map shown in FIG. 11 is used as an example. For the service i, after receiving the multiframe, the receiving node determines that indication fields that carry identification information of the service i are the first indication field, the $463^{th}$ indication field, the $925^{th}$ indication field, and the $1387^{th}$ indication field in the code block map, so that it can be determined that code blocks that carry the service i and that are in each data frame are a first code block, a $462^{th}$ code block, a $925^{th}$ code block, and a $1387^{th}$ code block in the payload area of the data frame. Further, the receiving node obtains data of the service i from the first code block, the $462^{th}$ code block, the $925^{th}$ code block, and the $1387^{th}$ code block in the payload area of each data frame.

In an embodiment, after receiving a first multiframe, the receiving node may obtain, from the multiframe, the location of the first indication field that carries the identification information of the service data, and then determine, based on the location of the first indication field that is learned from the first multiframe, the location of the code block carrying the service data and that is in the data frame. The location of the code block carrying the service data cannot be determined when each data frame in the first multiframe is received, but the location of the code block carrying the service data can be learned only after the first multiframe is received. Therefore, to reduce a data receiving delay, service data carried in each received data frame of the first multiframe may be discarded. Subsequently, starting from a second multiframe, the service data is obtained from the data frame based on the location, learned from the first multiframe, of the code block carrying the service data.

In the another embodiment, location information of the code block carrying the service data may be preconfigured on the receiving node, so that the receiving node obtains the service data from the code block that is indicated by the location information and that is included in the payload area of the data frame.

In an embodiment, a distribution location, in a payload area of a data frame, of a code block used for mapping each piece of service data may be statically configured for each sending node. Alternatively, a distribution location, in a payload area of a data frame, of a code block used for mapping each piece of service data may be dynamic. A controller or a network manager determines, based on a bandwidth allocation algorithm, the location of the code block used for mapping each piece of service data, and notifies each receiving node of the location.

For example, the determining, by a controller or a network manager that manages the sending node, the location of the code block used for mapping each piece of service data may be implemented in the following manner:

The controller or the network manager receives service bandwidth reported by each sending node, to determine bandwidth required by a to-be-transmitted service of each sending node, and determine, based on bandwidth of the data frame and the bandwidth required by each service, a quantity and locations of code blocks in a data frame that are occupied by each service. Then the controller or the network manager sends, to a corresponding sending node, the quantity and the locations of the code blocks in the data frame that are occupied by each service.

In an embodiment, if a sending node (for example, a sending node 1) determines that service bandwidth changes, the sending node may send changed service bandwidth to the controller or the network manager, so that the controller or the network manager can determine that bandwidth required by a service transmitted by the sending node 1 changes; re-determine, based on the bandwidth of the data frame and the changed bandwidth required by the service, a quantity and locations of code blocks in the data frame that are occupied by each service, in other words, re-determine a code block map in an overhead area of a multiframe; and send the re-determined code block map to each sending node (including the sending node 1), so that the sending node 1 adds switching information to an overhead area of a data frame to which mapping is performed subsequently. The switching information is used to indicate that a location, in each data frame, of a service transmitted starting from a next multiframe period changes. For example, the switching information may occupy a reserved field other than a reserved field occupied by an indication field in the overhead area.

If a receiving node 1 corresponding to the sending node 1 determines that an overhead area of a received data frame includes the switching information, when the next multiframe period arrives, the receiving node 1 re-determines, based on the switching information, a location of an indication field that is in an overhead area of a next multiframe and that carries the identification information of the service data; and obtains, based on a re-determined location, the service data from a payload area of a multiframe received starting from the next multiframe period.

In an embodiment, code blocks into which the data frame used in the method shown in FIG. 12 may further include an overhead code block. The overhead code block is used to carry clock information and/or time information of the service data mapped to a data frame in which the overhead code block is located. Correspondingly, an indication field in a code block map may be extended to indicate different code block types. In an embodiment, an indication field is divided into two parts. One part is used to carry identification information of service data, and the other part is used to carry code block type indication information. The indication information is used to indicate that a code block that is in the payload area of the data frame and whose arrangement location is the same as that of the indication field carrying the indication information is a data code block or an overhead code block. In an example, in a 16-bit indication field, the first five bits are used to distinguish whether a code block is currently used as a data code block or an overhead code block, and the last 11 bits carry identification information of service data.

In an embodiment, if a quantity of code blocks that correspond to a service and that carry data of the service is less than a preset threshold, the overhead code block may be included in a corresponding quantity of code blocks only in a first data frame of the multiframe. When the controller or the network manager determines a location of a code block, a condition may be added: A first data frame in each multiframe period includes an overhead code block, and an overhead code block in a subsequent data frame is used as a data code block. A service that occupies an overhead code block as a data code block, in other words, a fixed gap is formed in a first data frame in each multiframe period, for example, k code block locations are allocated to each data frame, and one multiframe period includes L frames, an effective rate of the service is: a data rate of a code block x $(L \times k-1)/(L \times k)$. This can improve utilization of a data frame.

In the solution provided in an embodiment of this application, a code block with a smaller granularity is obtained through division to carry a low-rate service, so that resources can be saved. In addition, if a 66B code block is used, the solution provided in an embodiment of this application may be applied to a FlexE network and a scenario in which a service is transmitted through a FlexE network and an OTN network.

When the solution is applied to the FlexE network, both the sending node and the receiving node in an embodiment of this application support a FlexE port. The sending node or the receiving node includes a MAC layer and a physical layer, and a FlexE shim layer is defined at the physical layer.

n 100 gigabit Ethernet (GE) rates are used at the FlexE shim layer. By using a time division multiplexing mechanism, data (service data) of a plurality of FlexE clients with different transmission rates at the MAC layer is scheduled based on a granularity of a fixed slot (for example, a 5-G slot or a 25-G slot), and is distributed as n FlexE frames with a transmission rate of 100 Gbit/s. Currently, at the FlexE shim layer, time domain resources of an optical module with a transmission rate of 100 Gbit/s are divided into 20 5-G slots, and then are scheduled based on a granularity of a 25-G slot and distributed into n FlexE frames with a transmission rate of 100 Gbit/s.

Figure 16:
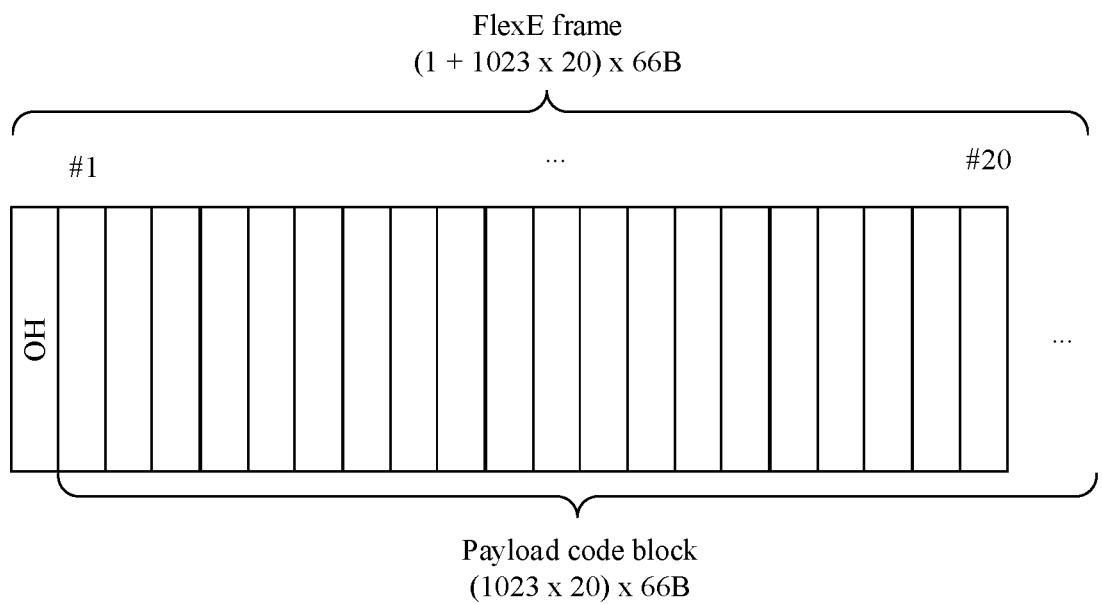
FIG. 16 is a schematic diagram of a structure of a FlexE frame according to an embodiment of this application.

FIG. 16 is a schematic diagram of a structure of a FlexE frame. As shown in FIG. 16, at a FlexE shim layer, 1023 payload code blocks are continuously transmitted by using each of 20 5-G slots, in other words, 20×1023 payload code blocks are continuously transmitted by using the 20 5-G slots. Then, at the FlexE shim layer, an overhead (OH) code block is inserted in front of the 20×1023 consecutive payload code blocks, so that the 1+20×1023 code blocks (including the overhead code block and the payload code blocks) form a FlexE frame. There is no other payload code block or overhead code block between the overhead code block and the 20×1023 consecutive payload code blocks. The overhead code block and the payload code blocks have a same size, namely, 66B. To distinguish an overhead code block included in the FlexE frame from a subsequent overhead code block defined in a payload code block, in an embodiment of this application, the overhead code block included in the FlexE frame is referred to as a first overhead code block, and the overhead code block defined in the payload code block is referred to as a second overhead code block.

When the solution is applied to the FlexE network, the solution may be implemented by the service data processing method in FIG. 7 or FIG. 12. To be specific, the data frame in FIG. 7 or FIG. 12 may be replaced with a FlexE frame applied to the FlexE network. For details, refer to the service data processing method in FIG. 7 or FIG. 12.

For example, in the second manner used in FIG. 12, a definition of a first overhead code block in a FlexE frame also needs to be extended, and a code block map is added by using a Calendar field and a reserved field in a plurality of first overhead code blocks included in a multiframe. An implementation is similar to that of an OTN frame, and details are not described herein again.

When the solution is applied to the scenario in which a service is transmitted through a FlexE network and an OTN network, for example, a sending node supports a FlexE port and transmits service data in a format of a FlexE frame, and a receiving node supports an OTN, in the solution provided in an embodiment of this application, both a FlexE frame transmitted on a FlexE channel and an OTN frame transmitted on an OTN channel are in a form of a 66B code block stream. Therefore, only a FlexE port needs to be configured for the receiving node, to receive a FlexE frame. Then a code block is extracted from the FlexE frame, and subsequent processing is performed on a 66B code block.

Using the first manner as an example, for the receiving node, after receiving the FlexE frame by using the FlexE port, the receiving node obtains a 66B payload code block of the FlexE frame, determines a second overhead code block in the payload code block, and extracts location information, included in the second overhead code block, of a data code block to which service data is mapped, to restore the service data from a data code block at a corresponding location based on quantity information and the location information that are included in the second overhead code block. If the service data needs to be further sent to a next node, the receiving node may further map the obtained payload code block to an ODU frame, and send the ODU frame to the next node.

Using the second manner as an example, for the receiving node, after receiving the FlexE frame by using the FlexE port, the receiving node obtains a payload code block of the FlexE frame, and determines, based on a location of an indication field that carries identification information of service data and that is in a first overhead code block of the FlexE frame, a location of a data code block to which the service data is mapped, to restore the service data from the data code block at the corresponding location. If the service data needs to be further sent to a next node, the receiving node may further map the obtained 66B payload code block in the FlexE frame to an ODU frame, add the identification information of the service data to a corresponding indication field in an overhead area of the ODU frame, and send the ODU frame to the next node.

In addition, in an embodiment of this application may also be applied to a scenario in which a sending node supports an OTN and a receiving node supports FlexE. In this scenario, only a port supporting an OTN frame may need to be configured for the receiving node. Specific processing methods in the two scenarios are similar, and reference may be made to each other. Details are not described again.

Figure 17:
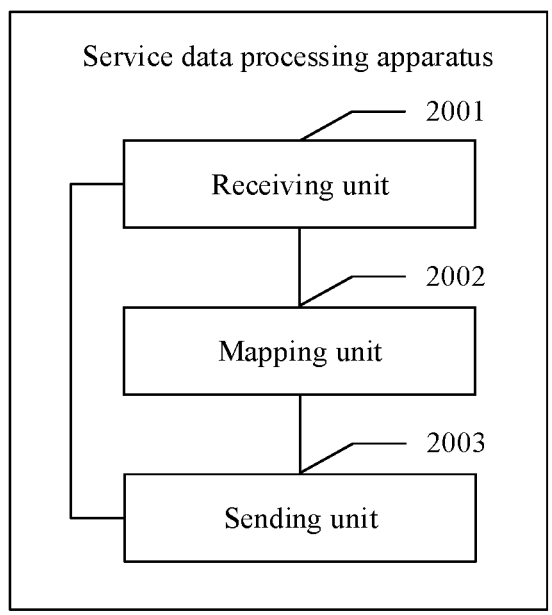
FIG. 17 is a schematic diagram of a service data processing apparatus according to an embodiment of this application.

Based on an invention idea same as that of the foregoing embodiments, an embodiment of this application further provides a service data processing apparatus. The apparatus is applied to a sending node, namely, an OTN device or a FlexE device on a transmitter side. The apparatus may be a processor, a chip, a chip system, a functional module used for sending, or the like. The apparatus may be located in the tributary board shown in FIG. 2, or may be implemented by the tributary board. As shown in FIG. 17, the apparatus includes a receiving unit 2001, a mapping unit 2002, and a sending unit 2003. The receiving unit 2001 is configured to perform S701 or S1201. The mapping unit 2002 is configured to perform S702 or S1202. The sending unit 2003 is configured to perform S703 or S1203. In an embodiment, the three units may further perform other related optional operations performed by the sending node mentioned in any one of the foregoing embodiments. Details are not described herein again.

Figure 18:
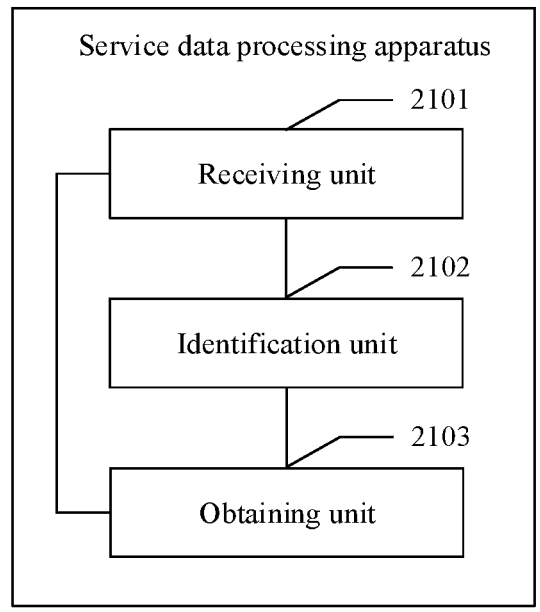
FIG. 18 is a schematic diagram of another service data processing apparatus according to an embodiment of this application.

An embodiment of this application further provides another service data processing apparatus. The apparatus is applied to a receiving node, namely, an OTN device or a FlexE device on a receiver side. The apparatus may be a processor, a chip, a chip system, a functional module used for receiving, or the like. The apparatus may be located in the tributary board shown in FIG. 2, or the apparatus is the tributary board shown in FIG. 2. As shown in FIG. 18, the apparatus may include a receiving unit 2101, an identification unit 2102, and an obtaining unit 2103. The receiving unit 2101 is configured to perform S704 or S1204. The identification unit 2102 is configured to perform S705 or S1205. The obtaining unit 2103 is configured to perform S706 or S1206. In an embodiment, the three units may further perform other related optional operations performed by the receiving node mentioned in any one of the foregoing embodiments. Details are not described herein again.

In an embodiment of this application, unit division is exemplary, and is merely a logical function division. In actual implementation, another division manner may be used. In addition, functional units in the embodiments of this application may be integrated into one processor, or may exist alone physically, or two or more units are integrated into one unit. The integrated unit may be implemented in a form of hardware, or may be implemented in a form of a software functional unit.

Figure 19:
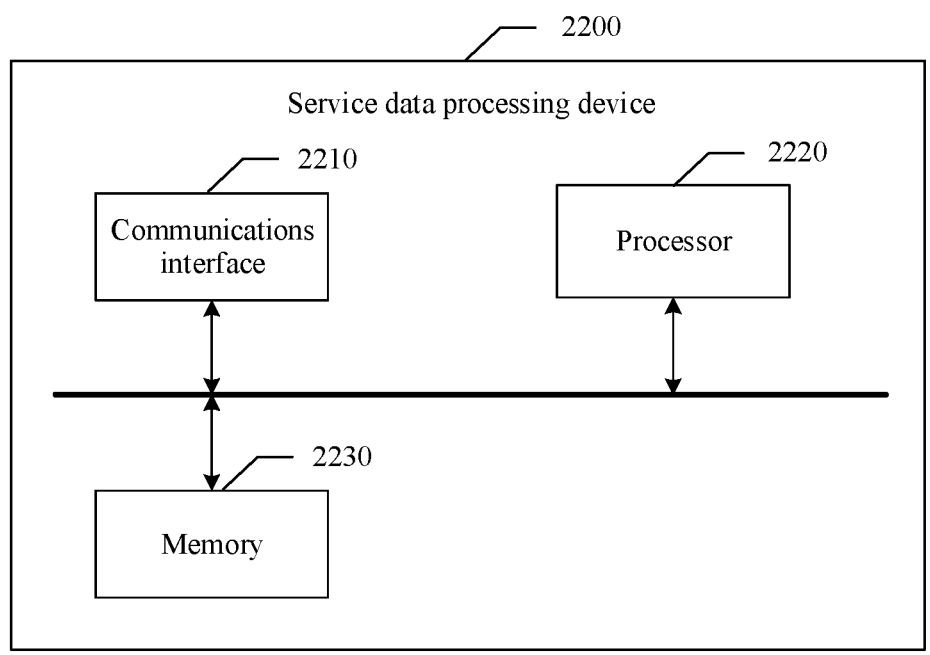
FIG. 19 is a schematic diagram of a device 2200 according to an embodiment of this application.

An embodiment of this application further provides a structure of another service data processing device. As shown in FIG. 19, the device 2200 includes a communications interface 2210, a processor 2220, and a memory 2230. The device may be applied to a sending node, or may be applied to a receiving node.

When the device is applied to a sending node, the receiving unit 2001, the mapping unit 2002, and the sending unit 2003 shown in FIG. 17 may all be implemented by the processor 2220, for example, the tributary board shown in FIG. 2. The processor 2220 receives service data through the communications interface 2210, and is configured to implement the method performed by the sending node in FIG. 7 and FIG. 12. In an implementation process, in operations of a processing procedure, the method performed by the sending node in FIG. 7 or FIG. 12 may be performed by using an integrated logic circuit of hardware in the processor 2220 or an instruction in a form of software.

When the device is applied to a receiving node, the receiving unit 2101, the identification unit 2102, and the obtaining unit 2103 shown in FIG. 18 may be implemented by the processor 2220, for example, the tributary board shown in FIG. 2. The processor 2220 receives service data through the communications interface 2210, and is configured to implement the method performed by the receiving node in FIG. 7 and FIG. 12. In an implementation process, in operations of a processing procedure, the method performed by the receiving node in FIG. 7 or FIG. 12 may be performed by using an integrated logic circuit of hardware in the processor 2220 or an instruction in a form of software.

In an embodiment of this application, the communications interface 2210 may be a circuit, a bus, a transceiver, or any other apparatus that can be used for information exchange. For example, the another apparatus may be a device connected to the device 2200. For example, when the device 2200 is applied to a sending node, the another apparatus may be a receiving node or an intermediate node.

In the embodiments of this application, the processor 2220 may be a general purpose processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in the embodiments of this application. The general purpose processor may be a microprocessor or any conventional processor or the like. The operations of the method disclosed with reference to the embodiments of this application may be directly performed by a hardware processor, or may be performed by using a combination of hardware in the processor and a software unit. Program code executed by the processor 2220 for implementing the foregoing method may be stored in the memory 2230. The memory 2230 is coupled to the processor 2220. In an embodiment of this application, the coupling is indirect coupling or a communication connection between apparatuses, units, or modules, may be in an electrical, mechanical, or another form, and is used for information exchange between the apparatuses, the units, or the modules. The processor 2220 and the memory 2230 may perform an operation cooperatively. The memory 2230 may be a nonvolatile memory, such as a hard disk drive (hard disk drive, HDD) or a solid-state drive (solid-state drive, SSD); or may be a volatile memory, such as a random access memory (RAM). The memory 2230 is any other medium that can be used to carry or store expected program code in a form of an instruction or a data structure and that can be accessed by a computer. However, this is not limited thereto.

In an embodiment of this application, a connection medium between the communications interface 2210, the processor 2220, and the memory 2230 is not limited. In an embodiment of this application, in FIG. 19, the memory 2230, the processor 2220, and the communications interface 2210 are connected by using a bus. The bus is represented by a bold line in FIG. 19. A connection manner between other components is described merely as an example and does not constitute a limitation. The bus may be classified into an address bus, a data bus, a control bus, and the like. For ease of representation, only one thick line is used to represent the bus in FIG. 19, but this does not mean that there is only one bus or only one type of bus.

Based on the foregoing embodiments, an embodiment of this application further provides a computer storage medium. The storage medium stores a software program. When the software program is read and executed by one or more processors, the method provided in any one or more of the foregoing embodiments may be implemented. The computer storage medium may include: any medium that can store program code, such as a USB flash drive, a removable hard disk, a read-only memory, a random access memory.

Based on the foregoing embodiments, an embodiment of this application further provides a chip. The chip includes a processor, configured to implement a function in any one or more of the foregoing embodiments, for example, obtain or process the data frame in the foregoing methods. In an embodiment, the chip further includes a memory. The memory is configured to store a program instruction and data that are necessary for execution of the processor. The chip may further include another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may also be stored in a computer-readable memory that can instruct the computer or any other programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and operations are performed on the computer or the another programmable device, thereby generating computer-implemented processing. Therefore, the instructions executed on the computer or the another programmable device provide operations for implementing a function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A service data processing method, comprising:
   receiving service data; and
   mapping the service data to a first quantity of code blocks in a data frame, wherein the first quantity of code blocks comprise an overhead code block and a data code block used to carry the service data, and wherein the overhead code block comprises location information of the data code block used to carry the service data.

2. The method according to claim 1, wherein the code block is a 66B code block.

3. The method according to claim 1, wherein the data frame comprises a second quantity of code blocks, wherein the data frame is an optical data unit (ODU) frame or a flexible optical transport network (FlexO) frame, and wherein the second quantity is greater than or equal to the first quantity.

4. The method according to claim 2, wherein the data frame further comprises fixed padding.

5. The method according to claim 1, wherein the data frame comprises a plurality of consecutive ODU frames or FlexO frames, wherein the plurality of consecutive ODU frames or the plurality of consecutive FlexO frames comprise a third quantity of code blocks, and wherein the third quantity is greater than the first quantity.

6. The method according to claim 1, wherein the data frame comprises a fixed slot area and a non-fixed slot area, wherein the data frame is an ODU frame or a FlexO frame, wherein the non-fixed slot area comprises a fourth quantity of code blocks, and wherein the fourth quantity is greater than or equal to the first quantity.

7. The method according to claim 1, wherein the first quantity is determined based on a service rate of the service data and a rate of the data frame.

8. A service data processing method, comprising:
   receiving service data; and
   mapping the service data to a first quantity of code blocks in a data frame, wherein the first quantity of code blocks are used for mapping the service data, wherein an overhead area of the data frame comprises at least one first indication field used to indicate a location of a code block carrying the service data.

9. The method according to claim 8, wherein a plurality of consecutive data frames form a multiframe, wherein a quantity of code blocks in a payload area of each data frame is the same as a quantity of indication fields comprising the first indication field and in an overhead area of the multiframe; wherein an ith indication field of the multiframe comprises identification information of service data carried by an ith code block in the payload area of the data frame, wherein i is any positive integer less than or equal to n, and wherein n is the quantity of code blocks comprised in the payload area of the data frame.

10. The method according to claim 9, the method further comprising:
    receiving location information, sent by a controller or a network manager, of a code block that is in the data frame and that needs to be occupied by a service corresponding to the service data.

11. The method according to claim 10, wherein the method further comprises:
    in response to determining that bandwidth required by the service changes:
    sending changed bandwidth of the service to the controller or the network manager, receiving the location information, sent by the controller or the network manager, of the code block that is in the data frame and that needs to be occupied by the service after the bandwidth changes;
    adding switching information to an overhead area of a data frame to which the service data is to be mapped, wherein the switching information is used to indicate that a location, in each data frame, of a service transmitted starting from a next multiframe period changes; and
    when the next multiframe period arrives, mapping the service data to the data frame based on the received location information of the code block that is in the data frame and that needs to be occupied by the service after the bandwidth changes.

12. The method according to claim 9, wherein the first quantity of code blocks used for mapping the service data comprise an overhead code block and a data code block, wherein the data code block is used to carry the service data, and wherein the overhead code block comprises clock information and/or time information of the service data mapped to a data frame in which the overhead code block is located.

13. The method according to claim 12, wherein the first indication field further comprises indication information to indicate that a code block that is in the payload area of the data frame and whose arrangement sequence number is the same as that of the first indication field is a data code block or an overhead code block.

14. The method according to claim 12, wherein if the first quantity is less than a preset threshold, the first quantity of code blocks only in a first data frame of the multiframe comprise the overhead code block.

15. An apparatus, comprising:
    a memory stores program code; and
    a processor is to read and execute the program code stored in the memory, to:
    receive service data; and
    map the service data to a first quantity of code blocks in a data frame, wherein the first quantity of code blocks comprises an overhead code block and a data code block, the data code block is used to carry the service data, and the overhead code block comprises location information of the data code block used to carry the service data.

16. The apparatus according to claim 15, wherein the code block is a 66B code block.

17. The apparatus according to claim 15, wherein the data frame comprises a second quantity of code blocks, wherein the data frame is an optical data unit (ODU) frame or a flexible optical transport network (FlexO) frame, and wherein the second quantity is greater than or equal to the first quantity.

18. The method according to claim 15, wherein the data frame comprises a plurality of consecutive ODU frames or FlexO frames, wherein the plurality of consecutive ODU frames or the plurality of consecutive FlexO frames comprise a third quantity of code blocks, and wherein the third quantity is greater than the first quantity.

19. The method according to claim 15, wherein the data frame comprises a fixed slot area and a non-fixed slot area, wherein the data frame is an ODU frame or a FlexO frame, wherein the non-fixed slot area comprises a fourth quantity of code blocks, and wherein the fourth quantity is greater than or equal to the first quantity.

20. The method according to claim 15, wherein the first quantity is determined based on a service rate of the service data and a rate of the data frame.

\* \* \* \* \*